US009981697B2

(12) United States Patent
Nakashima

(10) Patent No.: US 9,981,697 B2
(45) Date of Patent: May 29, 2018

(54) COWL STRUCTURE FOR A VEHICLE

(71) Applicant: TOYOTA JIDOSHA KABUSHIKI KAISHA, Toyota-shi, Aichi-ken (JP)

(72) Inventor: Mikio Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/300,112

(22) PCT Filed: Mar. 27, 2015

(86) PCT No.: PCT/JP2015/059780
§ 371 (c)(1),
(2) Date: Sep. 28, 2016

(87) PCT Pub. No.: WO2015/152096
PCT Pub. Date: Oct. 8, 2015

(65) Prior Publication Data
US 2017/0144709 A1 May 25, 2017

(30) Foreign Application Priority Data
Apr. 3, 2014 (JP) ................................. 2014-077277

(51) Int. Cl.
*B60S 1/04* (2006.01)
*B62D 25/08* (2006.01)
(Continued)

(52) U.S. Cl.
CPC ............ *B62D 25/081* (2013.01); *B60J 1/002* (2013.01); *B60J 10/34* (2016.02); *B60J 10/45* (2016.02);
(Continued)

(58) Field of Classification Search
CPC ........ B62D 25/10; B60K 11/08; B60K 13/02; E05Y 2900/536; F02M 35/161;
(Continued)

(56) References Cited

U.S. PATENT DOCUMENTS 3,843,194 A * 10/1974 Yamada ................... B60H 1/28
15/250.16
4,146,263 A * 3/1979 Watari ................. B62D 25/081
296/192
(Continued)

FOREIGN PATENT DOCUMENTS

DE 10 2009 032 855 A1 1/2010
JP H04-132812 U 12/1992
(Continued)

OTHER PUBLICATIONS

Dec. 15, 2017 Extended European Search Report issued in European Patent Application No. 15772392.5.

*Primary Examiner* — Kiran B Patel
(74) *Attorney, Agent, or Firm* — Oliff PLC

(57) ABSTRACT

A cowl structure for a vehicle that drains water drops. A cowl outer panel is provided opposing a front end portion side of an instrument panel. A downflow portion is provided at each of two end portions in the vehicle width direction of a floor wall portion of the cowl outer panel. A drainage member is provided at the lower side of each downflow portion. Hence, water drops that have flowed down the glass inner face of the front glass pass along the floor wall portion of the cowl outer panel, flow down through the downflow portion, and are guided to the drainage member. An outflow port is formed at drainage member. The outflow port is in fluid communication with a drainage port formed at a front pillar inner. Therefore, water in the drainage member may be drained out of the vehicle from the outflow port via the drainage port.

11 Claims, 13 Drawing Sheets

(51) Int. Cl.
  *B60R 13/07* (2006.01)
  *B60R 21/34* (2011.01)
  *B60J 10/70* (2016.01)
  *B60J 10/34* (2016.01)
  *B60J 10/00* (2016.01)
  *B62D 29/00* (2006.01)
  *B60J 1/00* (2006.01)

(52) U.S. Cl.
  CPC .............. *B60J 10/70* (2016.02); *B60R 13/07* (2013.01); *B60R 21/34* (2013.01); *B62D 29/001* (2013.01); *B60R 2021/343* (2013.01)

(58) Field of Classification Search
  CPC ............ B60R 21/34; B60R 2021/343; B60R 21/0136; B60R 19/483; B60R 2019/186
  USPC ........................................................ 296/192
  See application file for complete search history.

(56) References Cited

U.S. PATENT DOCUMENTS

| | | | | |
|---|---|---|---|---|
| 4,718,713 A * | 1/1988 | Sakamoto | ............ | B62D 25/081 296/187.09 |
| 4,721,032 A * | 1/1988 | Sakamoto | ............ | B60H 1/0055 454/146 |
| 4,909,566 A * | 3/1990 | Hashimoto | .......... | B60H 1/0055 296/192 |
| 5,533,779 A * | 7/1996 | Epple | .................. | B60H 3/0085 15/250.01 |
| 5,553,912 A * | 9/1996 | Kubina | ................. | B60J 1/2005 296/192 |
| 6,869,134 B2 * | 3/2005 | Kato | .................... | B62D 25/081 296/187.01 |
| 7,552,964 B2 * | 6/2009 | Saito | ......................... | B60J 1/02 296/187.04 |
| 8,915,539 B2 * | 12/2014 | Matsuoka | .............. | B62D 25/08 296/192 |
| 9,452,785 B2 * | 9/2016 | Tsuneyama | .......... | B62D 25/081 |
| 9,764,771 B1 * | 9/2017 | Hiwatashi | ............ | B62D 25/081 |
| 2005/0179285 A1 * | 8/2005 | Nakajima | ............. | B62D 25/081 296/192 |
| 2009/0146459 A1 * | 6/2009 | Watanabe | ............. | B62D 25/081 296/192 |
| 2010/0187862 A1 * | 7/2010 | Kurata | .................... | B60R 13/04 296/192 |
| 2013/0057027 A1 * | 3/2013 | Matsubara | .......... | B60R 13/0815 296/192 |
| 2013/0076072 A1 * | 3/2013 | Morden | ................ | B62D 25/081 296/192 |
| 2013/0113236 A1 * | 5/2013 | Oomen | ..................... | B60J 10/84 296/192 |
| 2013/0221705 A1 * | 8/2013 | Sugishima | .......... | B60R 13/0838 296/192 |
| 2013/0320712 A1 * | 12/2013 | Murofushi | ........... | B62D 25/081 296/192 |
| 2014/0367994 A1 * | 12/2014 | Sasaki | .................... | B62D 25/08 296/187.09 |
| 2015/0035318 A1 * | 2/2015 | Serizawa | .............. | B62D 25/081 296/187.09 |
| 2015/0091331 A1 * | 4/2015 | Takei | .................... | B62D 25/081 296/192 |

FOREIGN PATENT DOCUMENTS

| | | |
|---|---|---|
| JP | H06-166381 A | 6/1994 |
| JP | H07-309254 A | 11/1995 |
| JP | 2000-280934 A | 10/2000 |
| JP | 2001-354163 A | 12/2001 |
| JP | 2012-086606 A | 5/2012 |

\* cited by examiner

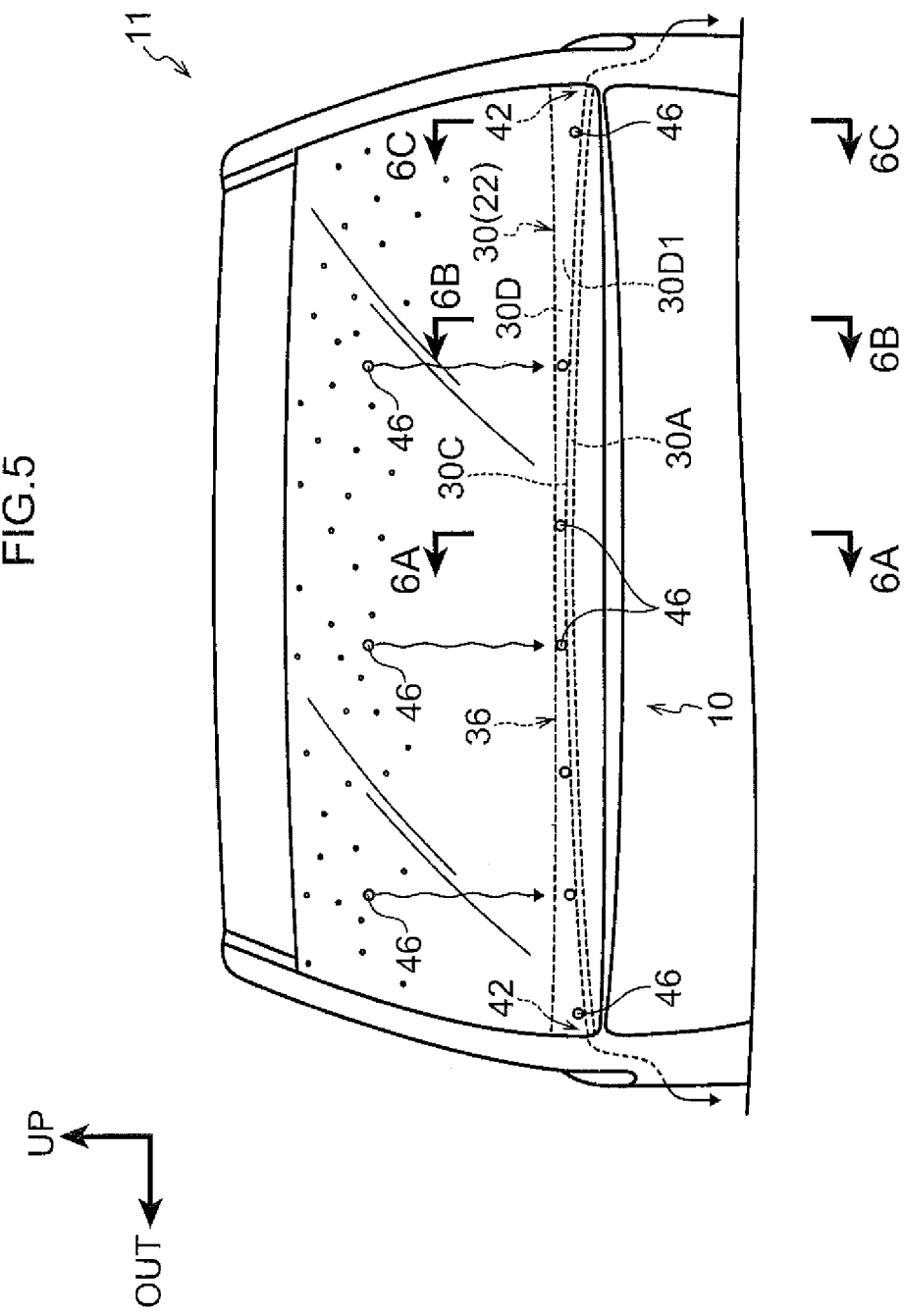

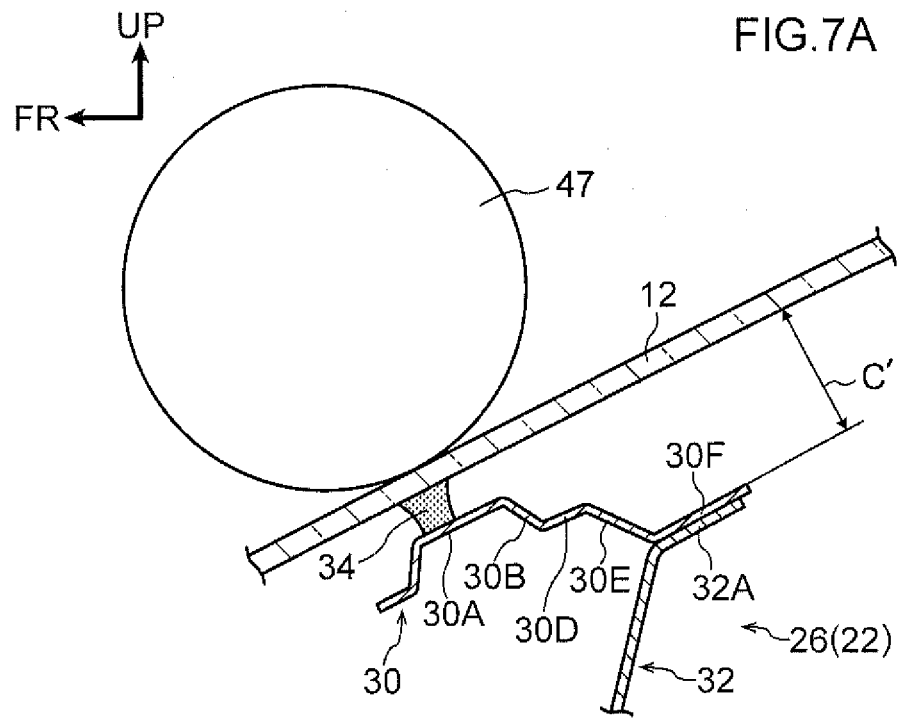
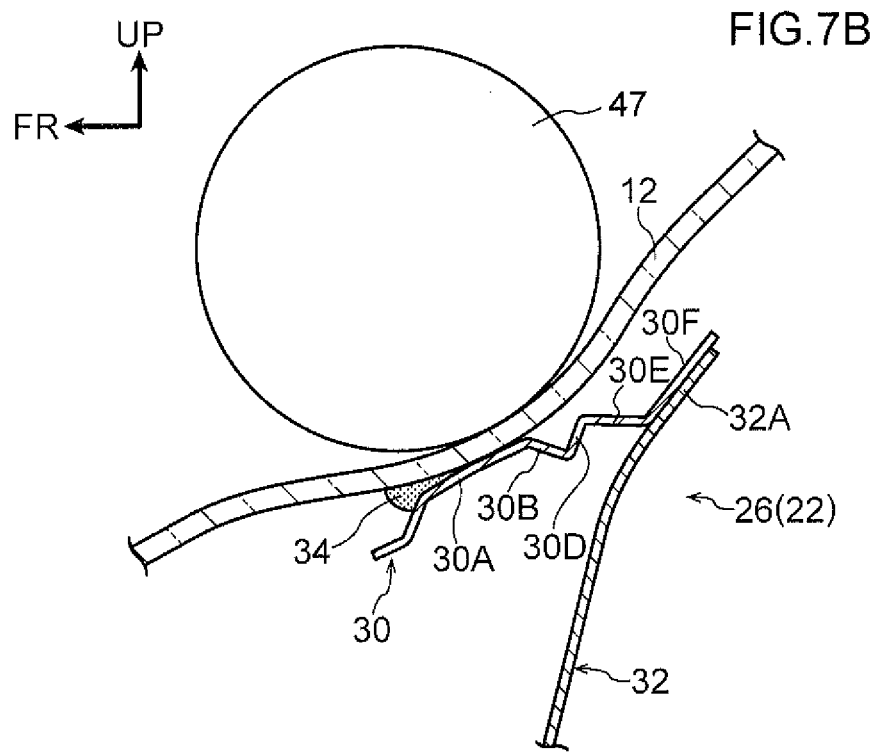

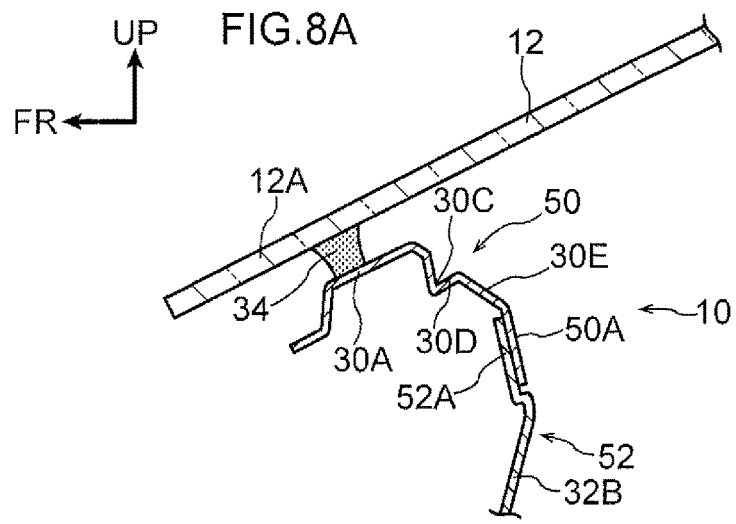
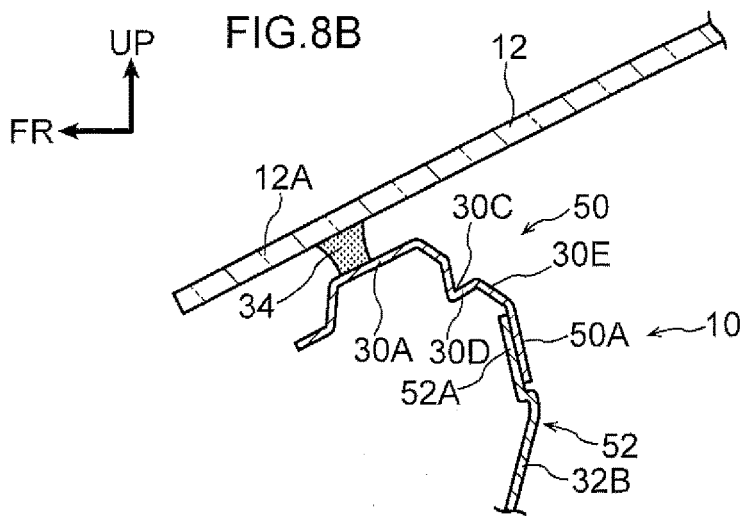
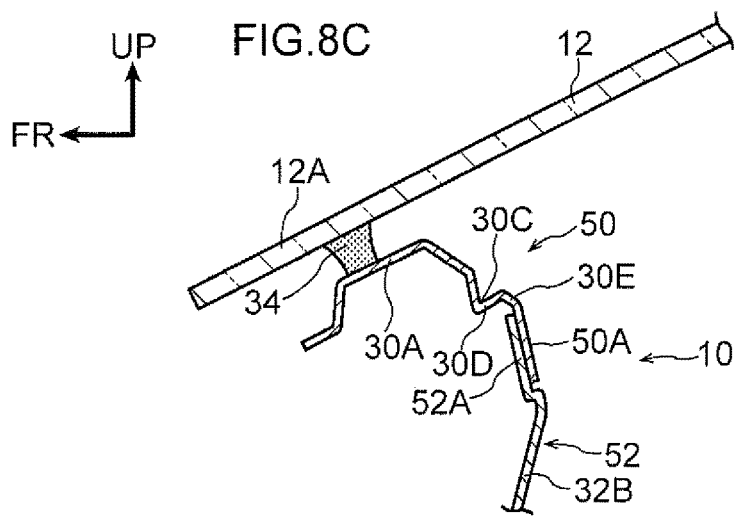

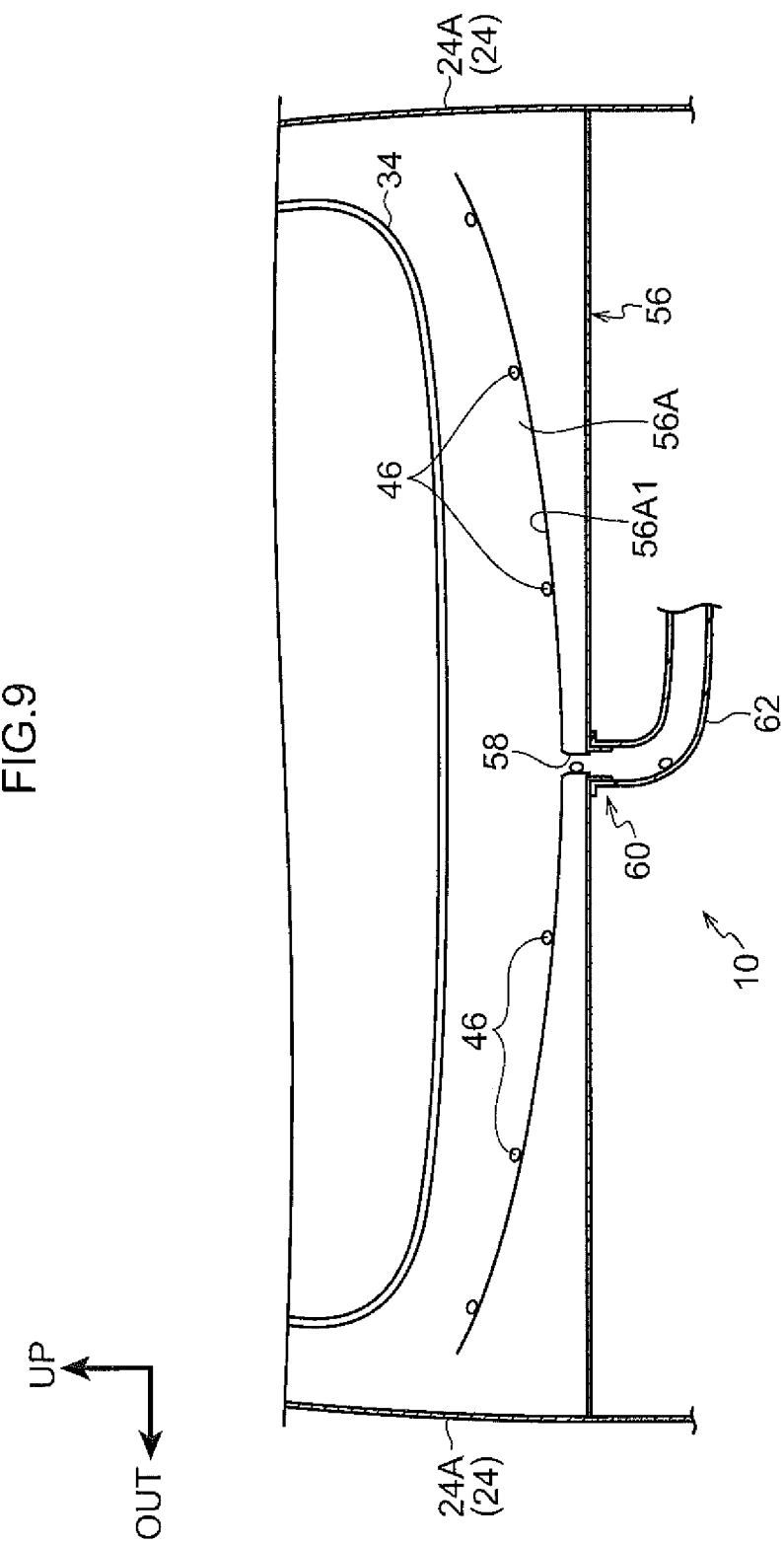

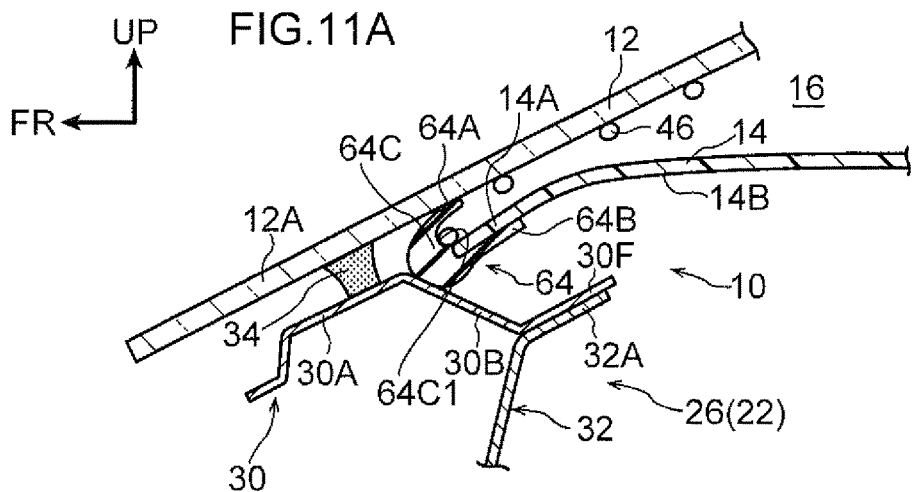
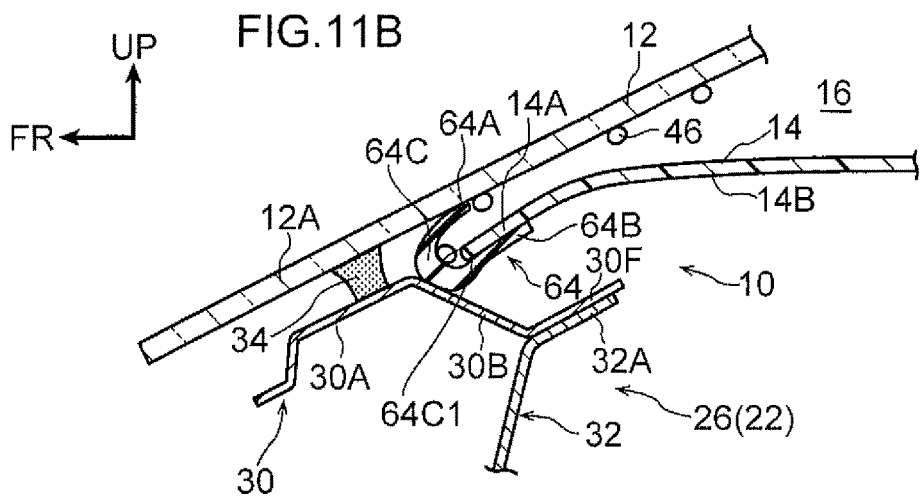
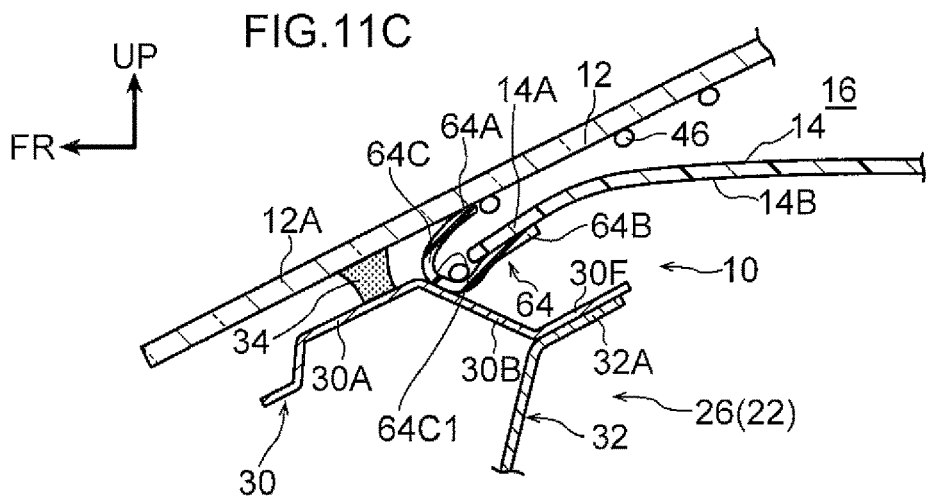

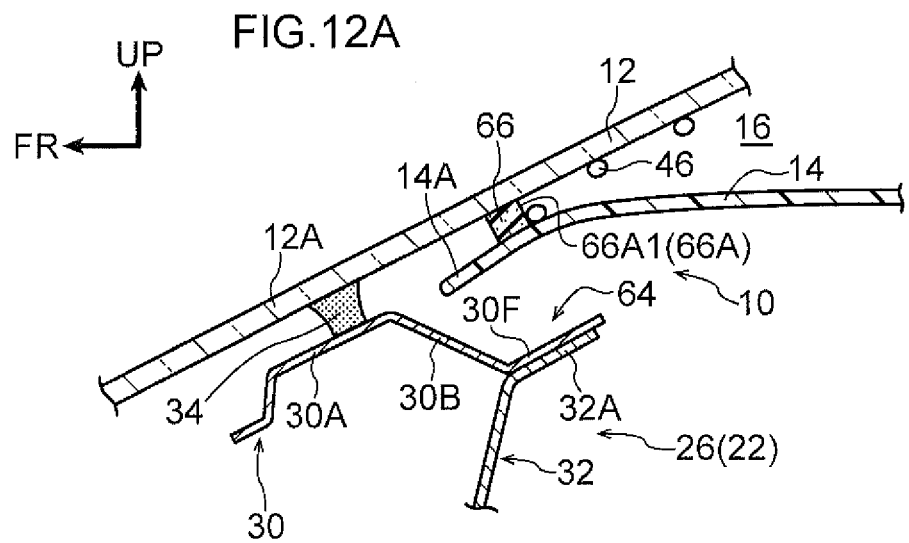
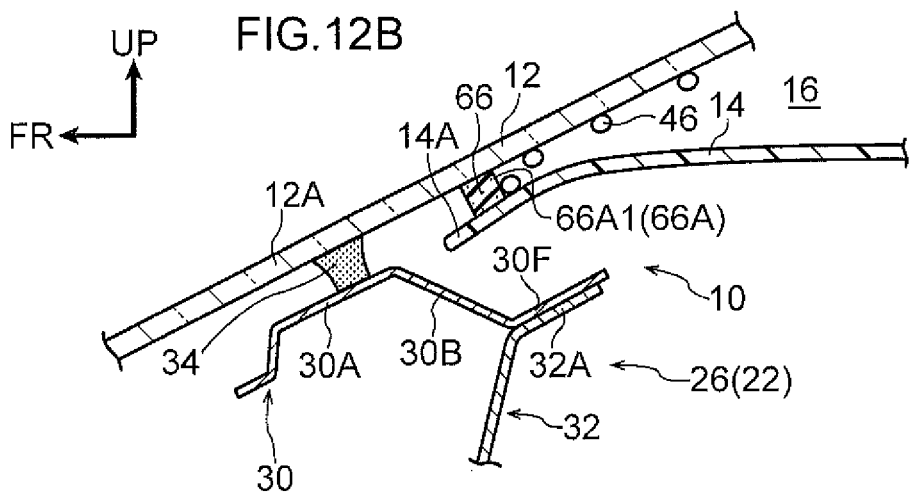
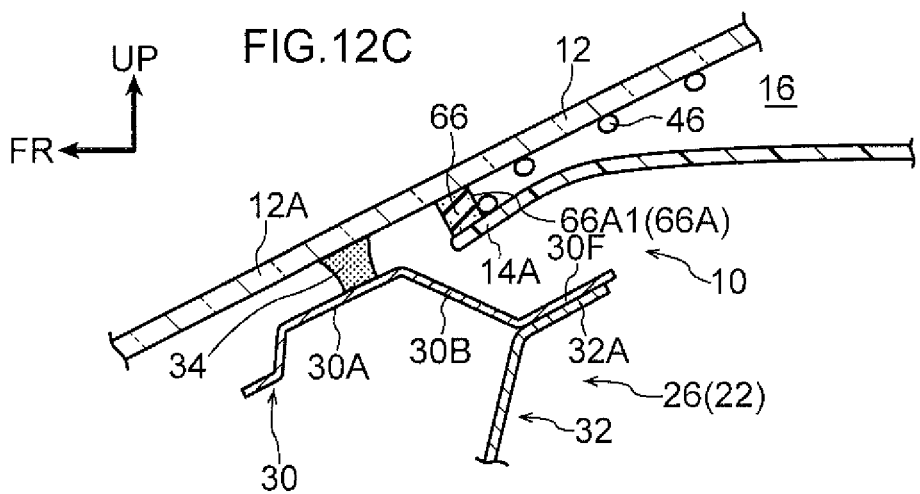

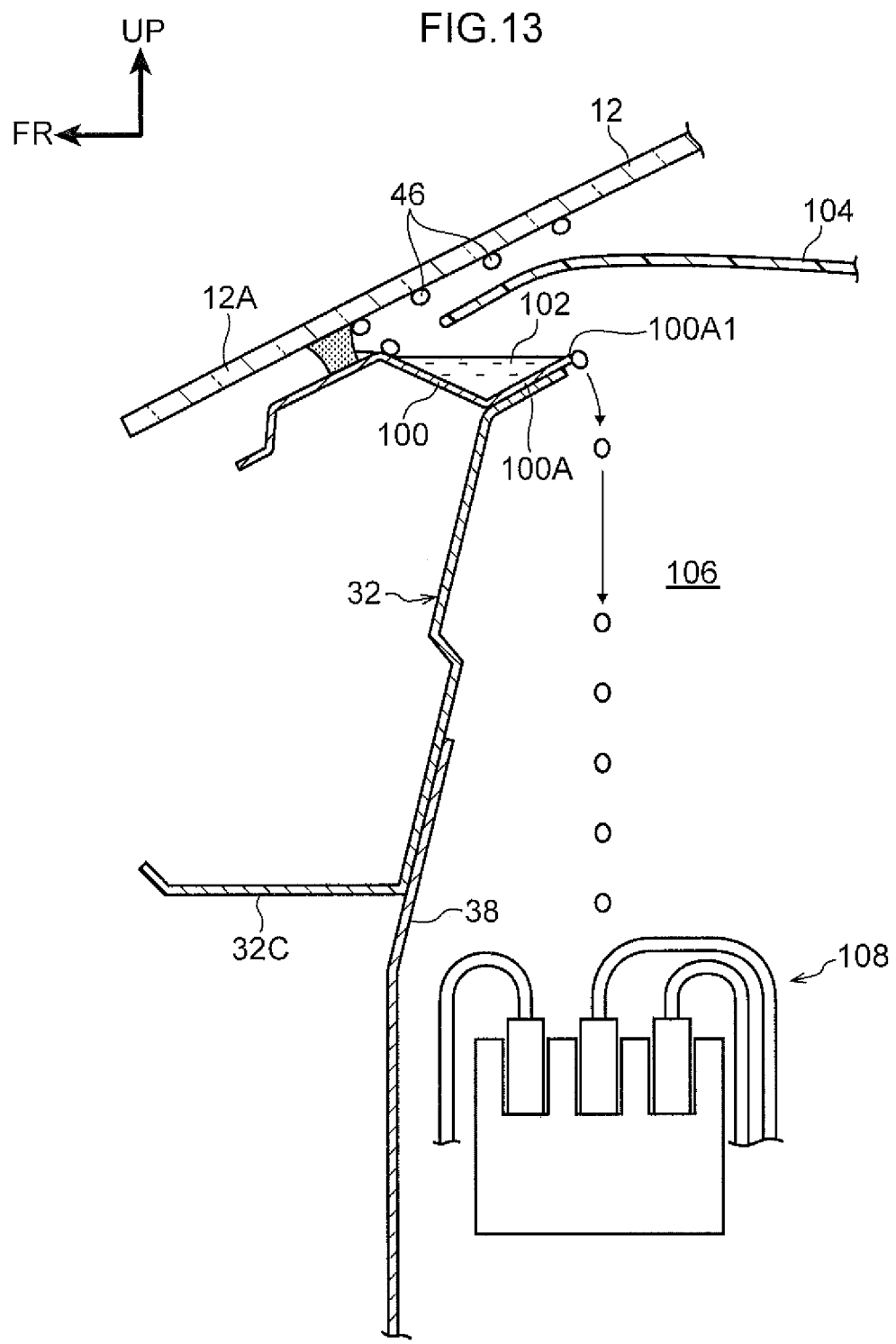

COWL STRUCTURE FOR A VEHICLE

TECHNICAL FIELD

The present invention relates to a cowl structure for a vehicle.

BACKGROUND ART

A technology is disclosed, for example, in Patent Document 1, in which a floor face of a front portion of a cowl is inclined at an angle ß along a vehicle width direction relative to a horizontal plane H, and rainwater and the like drains through a drainage portion that is provided at the lower side of the floor face at a vehicle width direction outer side of the cowl. Patent Document 2 discloses a technology in which a drainage gutter that drains rainwater is provided at a front portion of a cowl box that supports a lower end portion of a window glass (a front windshield glass). Patent Document 3 discloses a technology in which a rain gutter that drains rainwater is provided at a protector featuring a sealing function that is mounted at a lower end portion of a front glass (a front windshield glass).

RELATED ART REFERENCES

Patent References

Patent Document 1: Japanese Patent Application Laid Open (JP-A) No. H07-309254
Patent Document 2: JP-A No. 2000-280934
Patent Document 3: JP-A No. 2012-086606

SUMMARY OF INVENTION

Technical Problem

In a situation in which, for example, a door or window is left open during rainfall or the like, water may ingress to a vehicle cabin interior side and humidity may rise inside the vehicle cabin. Then, in conditions in which the external temperature is low, condensation may form at a glass inner face at the vehicle cabin interior side of a front windshield glass. Water drops may flow along the glass inner face and the water drops may flow to the side thereof at which a cowl is disposed. In this situation, with the related art technologies described above, water may accumulate at the cowl.

In consideration of the circumstances described above, an object of the present invention is to provide a cowl structure for a vehicle that may drain water drops that have flowed down a glass inner face of a front windshield glass out of the vehicle.

Solution to Problem

A cowl structure for a vehicle according to a first aspect includes: a cowl outer panel that extends in a vehicle width direction at a front end portion of a front windshield glass, the cowl outer panel supporting the front end portion of the front windshield glass from a lower side of the front windshield glass via a sealing member; and a drainage apparatus disposed at a rear side, in a vehicle front-rear direction, of the sealing member, at least a portion of the drainage apparatus being provided at the cowl outer panel, and the drainage apparatus draining, out of the vehicle, water drops that have flowed down a glass inner face at a vehicle cabin interior side of the front windshield glass.

In the cowl structure for a vehicle according to the first aspect, the cowl outer panel extends in the vehicle width direction at the front end portion of the front windshield glass. The front end portion of the front windshield glass is supported from the lower side thereof at the cowl outer panel via the sealing member.

The drainage apparatus of which at least a portion is provided at the cowl outer panel is provided at the rear side in the vehicle front-rear direction of the sealing member. Water drops that have flowed down the glass inner face at the vehicle cabin interior side of the front windshield glass are drained toward the vehicle exterior by this drainage apparatus.

In a cowl structure for a vehicle according to a second aspect, in the first aspect, the drainage apparatus includes: a downflow portion provided at a vehicle width direction end portion or a vehicle width direction central portion of the cowl outer panel; a floor wall portion provided along the vehicle width direction at the cowl outer panel, an inclined surface being formed at the floor wall portion, and the inclined surface being angled toward a lower side, in a vehicle up-down direction, of the downflow portion, from a side of the floor wall portion that is further from the downflow portion; and a drainage member disposed at the lower side, in the vehicle up-down direction, of the downflow portion, the drainage member draining the water drops out of the vehicle.

In the cowl structure for a vehicle according to the second aspect, the drainage apparatus is provided with the downflow portion at the vehicle width direction end portion or the vehicle width direction central portion of the cowl outer panel. The drainage member that drains water drops out of the vehicle is disposed at the lower side in the vehicle up-down direction of the downflow portion. In this structure, the floor wall portion is provided along the vehicle width direction at the cowl outer panel. The inclined surface is formed at the floor wall portion and is angled to the lower side in the vehicle up-down direction in the direction toward the downflow portion from the side of the floor wall portion that is further from the downflow portion.

That is, if the downflow portion is provided at each end portion in the vehicle width direction of the cowl outer panel, the inclined surface of the floor wall portion is formed to be angled to the lower side in the vehicle up-down direction in the direction from the central portion toward the end portion in the vehicle width direction. On the other hand, if the downflow portion is provided at the central portion in the vehicle width direction of the cowl outer panel, the inclined surface of the floor wall portion is formed to be angled to the lower side in the vehicle up-down direction in the direction from the end portion toward the central portion in the vehicle width direction. Thus, water drops are guided toward the downflow portion by the inclined surface and the water drops are drained out of the vehicle through the downflow portion.

In a cowl structure for a vehicle according to a third aspect, in the second aspect, the sealing member is adhered to the front windshield glass or the cowl outer panel at an adhesion portion, a cowl inner panel is disposed at a lower side, in the vehicle up-down direction, of the cowl outer panel, the cowl outer panel being joined to the cowl inner panel at a join portion, and a dimension in a normal direction of the front windshield glass from the adhesion portion to the join portion is constant over the whole range in the vehicle width direction of the cowl structure.

A support stiffness for the front windshield glass by the cowl outer panel and the cowl inner panel is specified so as to be in a predetermined range with a view to pedestrian protection and the like. Therefore, in the cowl structure for a vehicle according to the third aspect, it is preferable if the dimension in the normal direction of the front windshield glass from the cowl outer panel to the join portion with the cowl inner panel is constant over the whole range in the vehicle width direction.

When the cowl is considered as a unit, it does not include the front windshield glass. Accordingly, the separation distance in the vehicle up-down direction from the adhesion portion at which the sealing member is adhered to the join portion is specified to be constant over the whole range in the vehicle width direction.

As a result, the separation distance between the front windshield glass and the join portion in the normal direction of the front windshield glass is specified to be constant over the whole range in the vehicle width direction. The meaning of the term "constant" as used herein does not mean constant in a strict sense but "substantially constant"; some amount of error can be tolerated within a range that provides desired support stiffness for the front windshield glass.

In a cowl structure for a vehicle according to a fourth aspect, in the first aspect, the drainage apparatus includes: a downflow portion provided at a vehicle width direction end portion or a vehicle width direction central portion of the cowl outer panel; and a drainage member disposed at a lower side, in a vehicle up-down direction, of the downflow portion, the drainage member draining the water drops out of the vehicle, a sealing position of the sealing member with the front windshield glass being angled toward a lower side, in a vehicle up-down direction, of the downflow portion from a side of the sealing member that is further from the downflow portion.

In the cowl structure for a vehicle according to the fourth aspect, the drainage apparatus is provided with the downflow portion at the vehicle width direction end portion or the vehicle width direction central portion of the cowl outer panel, and the drainage member that drains water drops out of the vehicle is disposed at the lower side in the vehicle up-down direction of the downflow portion.

In this structure, the sealing member is specified such that the sealing position with the front windshield glass is angled to the lower side in the vehicle up-down direction in the direction toward the downflow portion from the side of the sealing member that is further from the downflow portion. That is, the inclined surface is formed by a side face of the sealing member at the vehicle cabin interior side thereof, water drops are guided toward the downflow portion by the inclined surface, and the water drops are drained through the downflow portion towards the vehicle exterior.

In a cowl structure for a vehicle according to a fifth aspect, in the first aspect, the drainage apparatus includes: a downflow portion provided at a vehicle width direction end portion or a vehicle width direction central portion of the cowl outer panel; a drainage member disposed at a lower side, in a vehicle up-down direction, of the downflow portion, the drainage member draining the water drops out of the vehicle; and a mounting member that is mounted at a front end portion of an instrument panel of the vehicle, one end portion of the mounting member being abutted against the front windshield glass, another end portion of the mounting member being abutted against a face of the instrument panel at an opposite side of the instrument panel from a side at which the front windshield glass is disposed, and a central portion of the mounting member that is disposed between the one end portion and the other end portion being follued so as to be angled toward a lower side, in the vehicle up-down direction, of the downflow portion from a side of the mounting member that is further from the downflow portion.

In the cowl structure for a vehicle according to the fifth aspect, the drainage apparatus is provided with the downflow portion at the vehicle width direction end portion or the vehicle width direction central portion of the cowl outer panel, and the drainage member that drains water drops towards the vehicle exterior is disposed at the lower side in the vehicle up-down direction of the downflow portion. In this structure, the mounting member is mounted at the front end portion of the instrument panel. The one end portion of the mounting member abuts against the front windshield glass, and the another end portion of the mounting member abuts against the face of the instrument panel at the opposite side thereof from the side at which the front windshield glass is disposed.

The central portion of the mounting member that is disposed between the one end portion and the another end portion is formed so as to be angled to the lower side in the vehicle up-down direction in the direction toward the downflow portion from the side of the mounting member that is further from the downflow portion. That is, the inclined surface is formed by the central portion of the mounting member, water drops are guided toward the downflow portion by the inclined surface, and the water drops are drained out of the vehicle through the downflow portion.

In a cowl structure for a vehicle according to a sixth aspect, in the first aspect, the drainage apparatus includes: a downflow portion provided at a vehicle width direction end portion or a vehicle width direction central portion of the cowl outer panel; a drainage member disposed at a lower side, in a vehicle up-down direction, of the downflow portion, the drainage member draining the water drops out of the vehicle; and a water-sealing sponge that is abutted against a front end portion of an instrument panel of the vehicle and the front windshield glass, an abutting position of the water-sealing sponge against the instrument panel being angled to a lower side, in a vehicle up-down direction, of the downflow portion from a side of the water-sealing sponge that is further from the downflow portion.

In the cowl structure for a vehicle according to the sixth aspect, the drainage apparatus is provided with the downflow portion at the vehicle width direction end portion or the vehicle width direction central portion of the cowl outer panel, and the drainage member that drains water drops towards the vehicle exterior is disposed at the lower side in the vehicle up-down direction of the downflow portion. In this structure, the water-sealing sponge is abutted against the front end portion of the instrument panel and against the front windshield glass.

The abutting position of the water-sealing sponge against the instrument panel is specified so as to be angled to the lower side in the vehicle up-down direction in the direction toward the downflow portion from the side of the water-sealing sponge that is further from the downflow portion. That is, the inclined surface is formed by a side face of the water-sealing sponge at the vehicle cabin interior side thereof, water drops are guided toward the downflow portion by the inclined surface, and the water drops are drained out of the vehicle through the downflow portion.

In a cowl structure for a vehicle according to a seventh aspect, in any one of the second aspect and the fourth to sixth aspects, the drainage member includes an inflow port that is in fluid communication with the downflow portion, and an outflow port that is in fluid communication with a drainage outlet, the drainage outlet being formed at a body side and draining the water drops out of the vehicle.

In the cowl structure for a vehicle according to the seventh aspect, the drainage member is structured with the inflow port and the outflow port. Water drops that have passed through the downflow portion and are flowing out from the downflow portion flow into the inflow port. The outflow port is in fluid communication with the drainage port formed at the body side. Water drops that have flowed in through the inflow port flow out through the outflow port to the drainage port and are drained out of the vehicle through the drainage port.

In a cowl structure for a vehicle according to an eighth aspect, in the first aspect, the drainage apparatus is structured so as to drain water drops, that have dropped onto the cowl outer panel, out of the vehicle by a cross-sectional shape of the cowl outer panel cut along a vehicle up-down direction being varied along the cowl outer panel in the vehicle width direction.

In a cowl structure for a vehicle according to a ninth aspect, in the seventh aspect, the outflow port is formed at a front pillar that is disposed at a vehicle width direction end portion of the cowl outer panel, the water drops being drained out of the vehicle through the outflow port.

In a cowl structure for a vehicle according to a tenth aspect, in the third aspect, the cowl outer panel includes: a glass support portion that is parallel with the front windshield glass and that serves as the adhesion portion; a front wall portion that is inflected toward the lower side, in the vehicle up-down direction, from a rear end portion, in the vehicle front-rear direction, of the glass support portion; a floor wall portion that is inflected toward a rear side, in the vehicle front-rear direction, and the upper side, in the vehicle up-down direction, from a rear end portion, in the vehicle front-rear direction, of the front wall portion, the floor wall portion being parallel with the front windshield glass; a rear wall portion that is inflected toward the lower side, in the vehicle up-down direction, from a rear end portion, in a vehicle front-rear direction, of the floor wall portion; and a flange portion that is inflected toward the rear side, in the vehicle front-rear direction, and the upper side, in the vehicle up-down direction, from a rear end portion, in the vehicle front-rear direction, of the rear wall portion, and that is parallel with the front windshield glass, and that serves as the join portion, the flange portion being superposed in the vehicle up-down direction with a joined portion of the cowl inner panel.

In a cowl structure for a vehicle according to an eleventh aspect, in the third aspect, the cowl outer panel includes: a glass support portion that is parallel with the front windshield glass and serves as the adhesion portion; a front wall portion that is inflected toward the lower side, in the vehicle up-down direction, from a rear end portion, in the vehicle front-rear direction, of the glass support portion; a floor wall portion that is inflected toward a rear side, in the vehicle front-rear direction, and the upper side, in the vehicle up-down direction, from a rear end portion, in the vehicle front-rear direction, of the front wall portion, the floor wall portion being parallel with the front windshield glass; a rear wall portion that is inflected toward the lower side, in the vehicle up-down direction, from a rear end portion, in the vehicle front-rear direction, of the floor wall portion; and a joining wall that protrudes toward a lower side, in the vehicle up-down direction, from a rear end portion, in the vehicle front-rear direction, of the rear wall portion, and that serves as the join portion, the joining wall being superposed in the vehicle front-rear direction with a joined portion of the cowl inner panel.

Advantageous Effects of Invention

As described above, the cowl structure for a vehicle according to the first aspect has an excellent effect in that water drops that have flowed down the glass inner face of the front windshield glass may be drained out of the vehicle.

According to the cowl structure for a vehicle according to the second aspect, an excellent effect is provided in that water drops that have flowed down the glass inner face of the front windshield glass are guided to the downflow portion by the inclined surface of the floor wall portion formed at the cowl outer panel and are drained out of the vehicle from the downflow portion through the drainage member.

According to the cowl structure for a vehicle according to the third aspect, an excellent effect is provided in that a support stiffness of the front windshield glass for pedestrian protection may be assured even though the inclined surface is formed at the floor wall portion of the cowl outer panel.

According to the cowl structure for a vehicle according to the fourth aspect, an excellent effect is provided in that water drops that have flowed down the glass inner face of the front windshield glass are guided to the downflow portion by the sealing member that seals between the front windshield glass and the cowl outer panel and are drained out of the vehicle from the downflow portion through the drainage member.

According to the cowl structure for a vehicle according to the fifth aspect, an excellent effect is provided in that water drops that have flowed down the glass inner face of the front windshield glass are guided to the downflow portion by the mounting member that is mounted at the instrument panel and are drained out of the vehicle from the downflow portion through the drainage member.

According to the cowl structure for a vehicle according to the sixth aspect, an excellent effect is provided in that water drops that have flowed down the glass inner face of the front windshield glass are guided to the downflow portion by the water-sealing sponge that is provided between the front windshield glass and the instrument panel and are drained out of the vehicle from the downflow portion through the drainage member.

According to the cowl structure for a vehicle according to the seventh aspect, an excellent effect is provided in that the water drops that have flowed down from the downflow portion to the drainage member are drained out of the vehicle through the drainage port formed at the body side.

BRIEF DESCRIPTION OF DRAWINGS

FIG. 5 is a schematic front view showing the cowl structure for a vehicle in accordance with the first exemplary embodiment.

FIG. 7A is a magnified sectional diagram, corresponding to FIG. 6A, showing a state just before an impact body impacts against a front glass.

FIG. 7B is a magnified sectional diagram, corresponding to FIG. 6A, showing a state when the impact body has impacted against the front glass.

FIG. 8A is a magnified sectional diagram, corresponding to FIG. 6A, showing an alternative embodiment (1) of the cowl structure for a vehicle in accordance with the first exemplary embodiment.

FIG. 8B is a magnified sectional diagram, corresponding to FIG. 6B, showing the alternative embodiment (1) of the cowl structure for a vehicle in accordance with the first exemplary embodiment.

FIG. 8C is a magnified sectional diagram, corresponding to FIG. 6C, showing the alternative embodiment (1) of the cowl structure for a vehicle in accordance with the first exemplary embodiment.

FIG. 9 is a schematic sectional diagram, corresponding to FIG. 4, showing an alternative embodiment (2) of the cowl structure for a vehicle in accordance with the first exemplary embodiment.

FIG. 11A is a magnified sectional diagram, corresponding to FIG. 6A, showing a cowl structure for a vehicle in accordance with a third exemplary embodiment.

FIG. 11B is a magnified sectional diagram, corresponding to FIG. 6B, showing the cowl structure for a vehicle in accordance with the third exemplary embodiment.

FIG. 11C is a magnified sectional diagram, corresponding to FIG. 6C, showing the cowl structure for a vehicle in accordance with the third exemplary embodiment.

FIG. 12A is a magnified sectional diagram, corresponding to FIG. 6A, showing a cowl structure for a vehicle in accordance with a fourth exemplary embodiment.

FIG. 12B is a magnified sectional diagram, corresponding to FIG. 6B, showing the cowl structure for a vehicle in accordance with the fourth exemplary embodiment.

FIG. 12C is a magnified sectional diagram, corresponding to FIG. 6C, showing the cowl structure for a vehicle in accordance with the fourth exemplary embodiment.

FIG. 13 is a magnified sectional diagram, corresponding to FIG. 2, of a comparative example.

DESCRIPTION OF EMBODIMENTS

Figure 1:
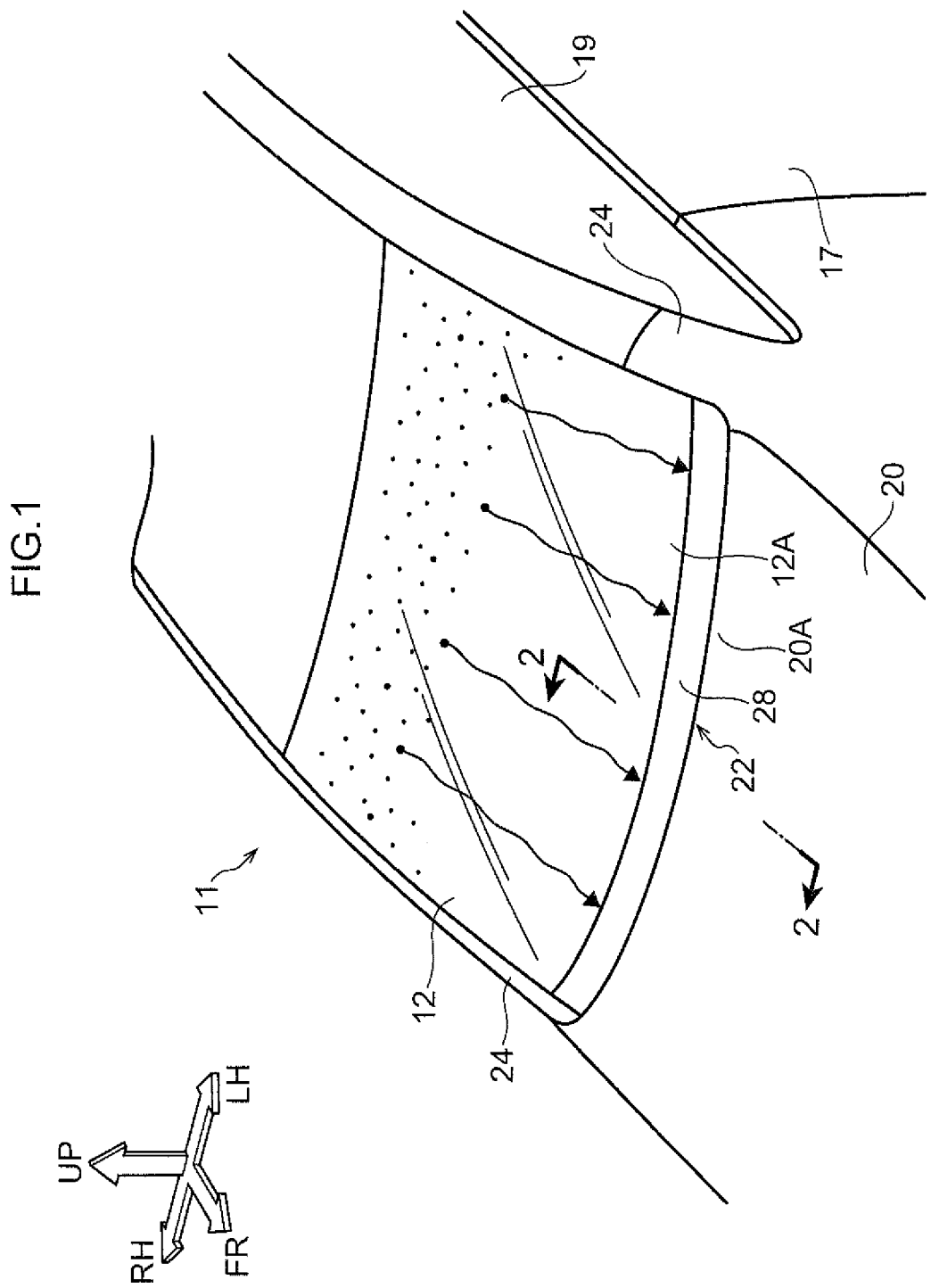
FIG. 1 is a perspective view showing a portion of a vehicle in which a cowl structure for a vehicle in accordance with a first exemplary embodiment is employed, in a view seen from diagonally forward of the vehicle.

Below, cowl structures for a vehicle according to present exemplary embodiments are described in accordance with the attached drawings. The arrow UP in the drawings indicates a vehicle upper direction, the arrow FR indicates a vehicle front direction, and the arrow OUT indicates a vehicle outer side. In the following descriptions, where the terms front, rear, up, down, left and right are used without being particularly specified, the same refer to the front and rear in the vehicle front-rear direction, up and down in the vehicle up-down direction, and left and right in the vehicle left-and-right direction (the vehicle width direction).

=First Exemplary Embodiment=

—Structures of the Cowl Structure for a Vehicle—

FIG. 1 is a perspective view in which a portion of a vehicle (a car) in which a cowl structure for a vehicle according to a first exemplary embodiment is employed is viewed diagonally from the front side of the vehicle (wiper arms and the like are not shown in the drawing), As shown in FIG. 1, a cowl 22 that extends between left and right front pillars 24 is arranged along the vehicle width direction between a front end portion 12A of a front windshield glass (below referred to as "the front glass") 12 of a vehicle (a car) 11 and a rear end portion 20A of a hood (an engine hood) 20. The cowl 22 features a function of separating air and water that flow in toward the interior of a vehicle cabin 16 (see FIG. 2). A power unit (not shown in the drawings) may be accommodated at the interior of the cowl 22.

The cowl 22 is provided with a cowl main body 26 fabricated of metal plate, which is arranged along the vehicle width direction at the lower side in the vehicle up-down direction of the front glass 12. The cowl 22 is also provided with a cowl louver 28 (see FIG. 1) fabricated of resin, which is arranged at the upper side of the cowl main body 26. External air intake portions and the like of the cowl louver 28 are not shown in these drawings.

Figure 2:
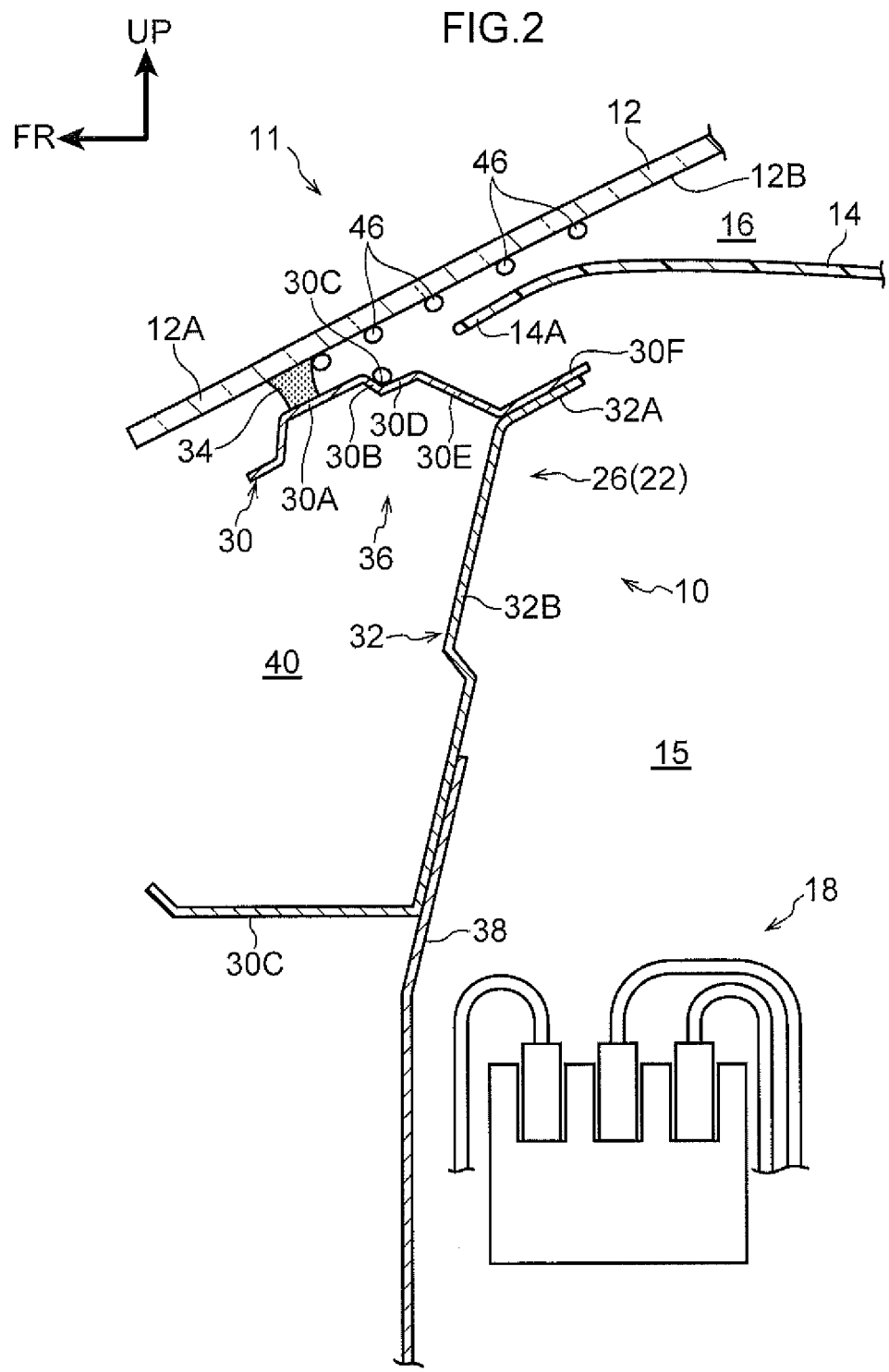
FIG. 2 is a magnified sectional diagram showing a magnification of a view cut along line 2-2 in FIG. 1.

FIG. 2 is a magnified sectional diagram showing a magnification of a view that is cut along line 2-2 of FIG. 1. As shown in FIG. 2, an instrument panel 14 is provided at the lower side in the vehicle up-down direction of the front glass 12. Electrical components 18, such as an air conditioner that produces air for blowing inside the vehicle cabin 16 and the like, are disposed in an interior portion 15 of the instrument panel 14.

The cowl main body 26 is provided with a cowl outer panel 30 and a cowl inner panel 32. The cowl outer panel 30 is disposed at the lower side in the vehicle up-down direction of the front glass 12 and extends along the vehicle width direction. The cowl inner panel 32 extends along the vehicle width direction at the lower side in the vehicle up-down direction of the cowl outer panel 30.

A glass support portion 30A at a front portion side of the cowl outer panel 30 is disposed at the front end portion 12A of the front glass 12. The glass support portion 30A is formed to be arranged substantially in parallel with the front glass 12, and the glass support portion 30A extends along the vehicle width direction. A sealing member 34 of urethane or the like is provided at the glass support portion 30A. The front end portion 12A of the front glass 12 is adhered to (and supported at) the sealing member 34.

A drainage apparatus 36, which is described below, extends along the vehicle width direction at the rear side of the glass support portion 30A of the cowl outer panel 30 (the rear side in the vehicle front-rear direction of the sealing member 34), opposing a front end portion 14A of the instrument panel 14 at the lower side of the instrument panel 14.

To be specific, the cowl outer panel 30 is inflected toward the lower side and the rear side at the rear side in the vehicle front-rear direction of the glass support portion 30A, forming a front wall portion 30B. The cowl outer panel 30 inflects toward the upper side and the rear side (an inflection portion 30C) from a rear end portion of the front wall portion 30B, forming a floor wall portion 30D. The floor wall portion 30D structures a portion of the drainage apparatus.

The floor wall portion 30D is formed to be substantially parallel with the front glass 12. The cowl outer panel 30 inflects toward the lower side and the rear side from a rear end portion of the floor wall portion 30D, forming a rear wall portion 30E. A flange portion 30F that serves as a join portion inflects toward the upper side and the rear side from a rear end portion of the rear wall portion 30E. The flange portion 30F is formed to be substantially parallel with the front glass 12.

A flange portion 32A is provided at a rear end portion of the cowl inner panel 32. In a state in which the flange portion 32A is superposed under the flange portion 30F of the cowl outer panel 30, the flange portion 32A is joined by welding to the flange portion 30F. The cowl inner panel 32 inflects toward the lower side and the front side from a front end portion of the flange portion 32A, forming a rear wall portion 32B that extends away from the front glass 12.

A dash panel 38 is joined by welding to a lower portion of the rear wall portion 32B. A floor wall portion 32C is formed to inflect toward the front side from the lower end portion of the rear wall portion 32B. A cavity portion 40 is provided between the cowl inner panel 32 and the cowl outer panel 30. The aforementioned power unit or the like is accommodated in the cavity portion 40.

Figure 3:
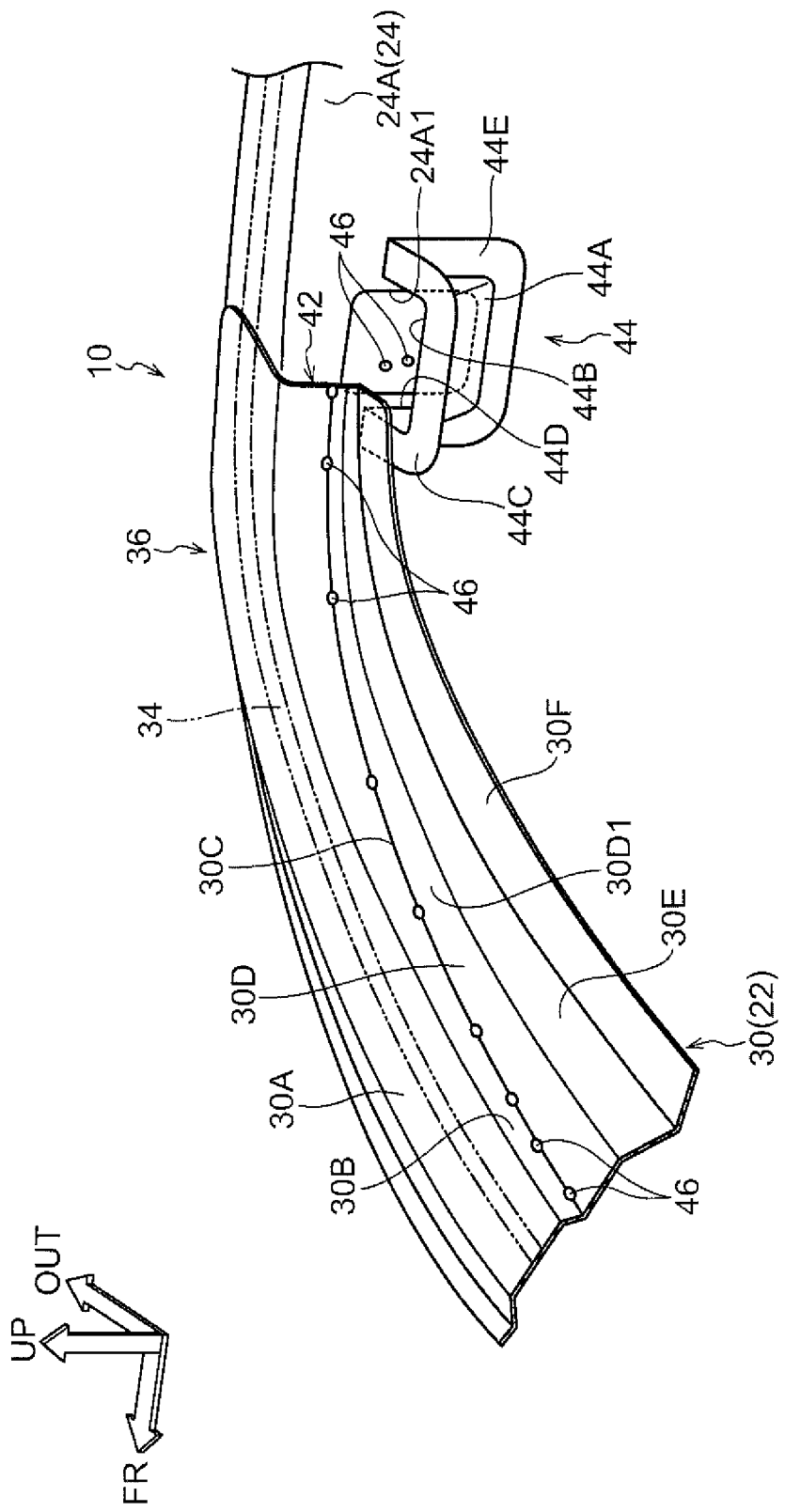
FIG. 3 is a magnified perspective diagram of principal portions in which principal portions of the cowl structure for a vehicle in accordance with the first exemplary embodiment are shown magnified.
Figure 4:
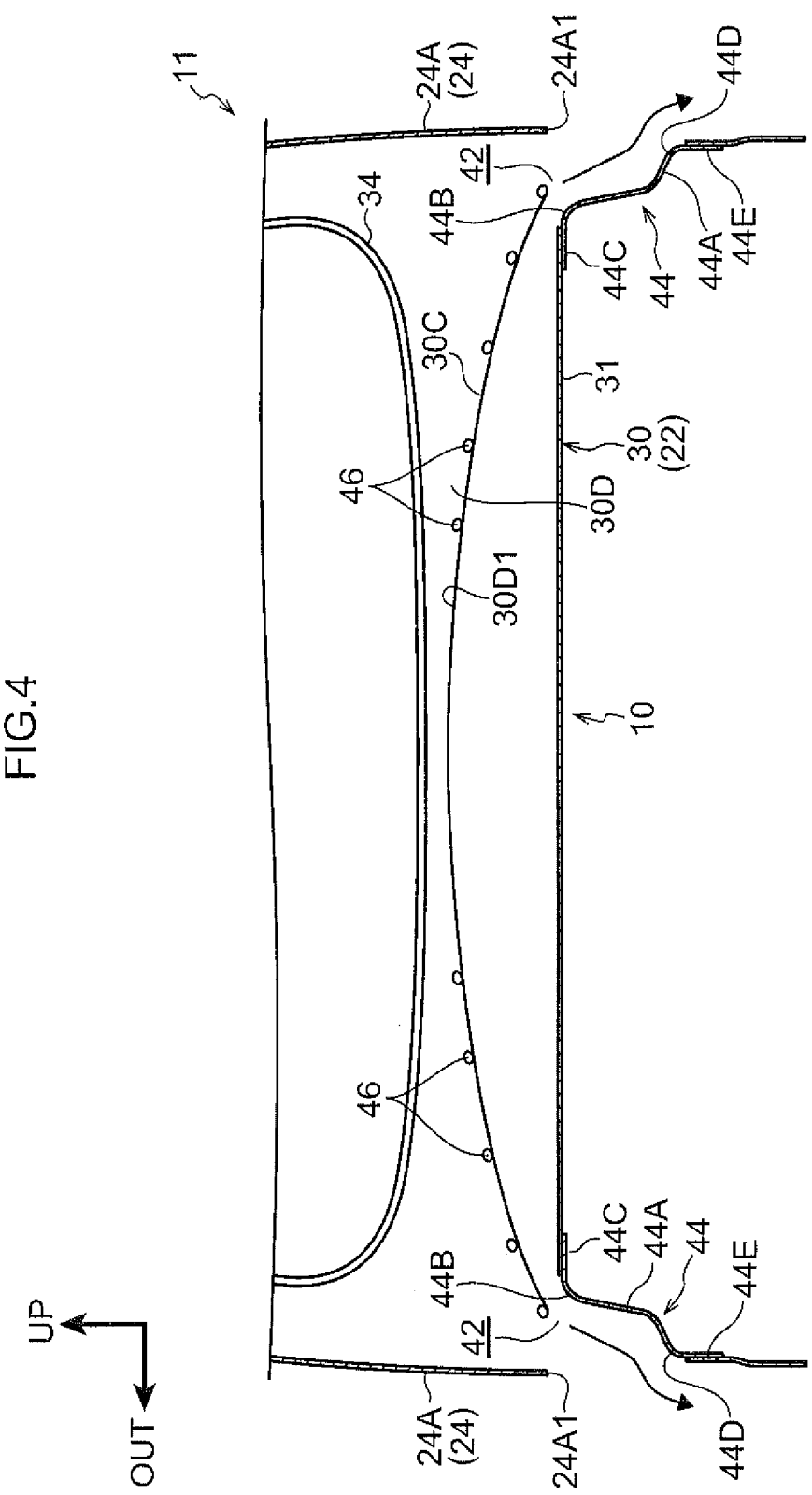
FIG. 4 is a schematic sectional diagram showing the cowl structure for a vehicle in accordance with the first exemplary embodiment in a view cut along a vehicle width direction.

As shown in FIG. 3 and FIG. 4, in the present exemplary embodiment, downflow portions 42 are provided at the vehicle width direction outer sides of the cowl outer panel 30. Each downflow portion 42 structures a portion of a drainage apparatus at the floor wall portion 30D. The downflow portion 42 represents a location at which water drops 46 that have flowed down a front glass inner face 12B and flowed along the floor wall portion 30D flow down to the lower side of the cowl outer panel 30. In this structure, end portions of the floor wall portion 30D serve as the downflow portions 42. FIG. 4 is a schematic sectional diagram of a view in which a vehicle cowl structure 10 is cut along the vehicle width direction, showing a view seen from the vehicle rear side of the front glass 12.

A drainage member 44 is provided at the lower side of each downflow portion 42. The drainage member 44 is provided with a main body portion 44A, a cross-sectional shape of which when cut along the up-down direction forms a substantial "L" shape (see the right side of the drawing of FIG. 4). An inflow port 44B is provided at the main body portion 44A at a position that is in fluid communication with the downflow portion 42. The water drops 46 that have flowed down through the downflow portion 42 pass through the inflow port 44B and flow into the main body portion 44A. An abutting piece 44C projects to an outer side of the inflow port 44B from a periphery edge portion of the inflow port 44B. The abutting piece 44C abuts against and is joined to the cowl outer panel 30 at a side thereof at which a lower face 31 is provided (see FIG. 4).

An outflow port 44D is also formed at the drainage member 44. The outflow port 44D is in fluid communication with a drainage port 24A1 formed at a front pillar inner 24A that structures the front pillar 24, which serves as the body of the vehicle. An abutting piece 44E projects to an outer side of the outflow port 44D from a periphery edge portion of the outflow port 44D. The abutting piece 44E abuts against and is joined to the front pillar inner 24A. The drainage port 24A1 formed at the front pillar inner 24A communicates with the vehicle exterior via a rocker (not shown in the drawings). The water drops 46 that have flowed in through the outflow port 44D of the drainage member 44 pass through the drainage port 24A1 and are drained out of the vehicle, In this exemplary embodiment, inclined surfaces 30D1 are formed at the floor wall portion 30D. Each inclined surface 30D1 is angled to the lower side in the vehicle up-down direction in the direction toward the downflow portion 42 from the side of the inclined surface 30D1 that is further from the downflow portion 42. That is, the inclined surface 30D1 is angled to the lower side in the vehicle up-down direction in the direction toward the outer side from the vehicle width direction central portion.

Figure 6A:
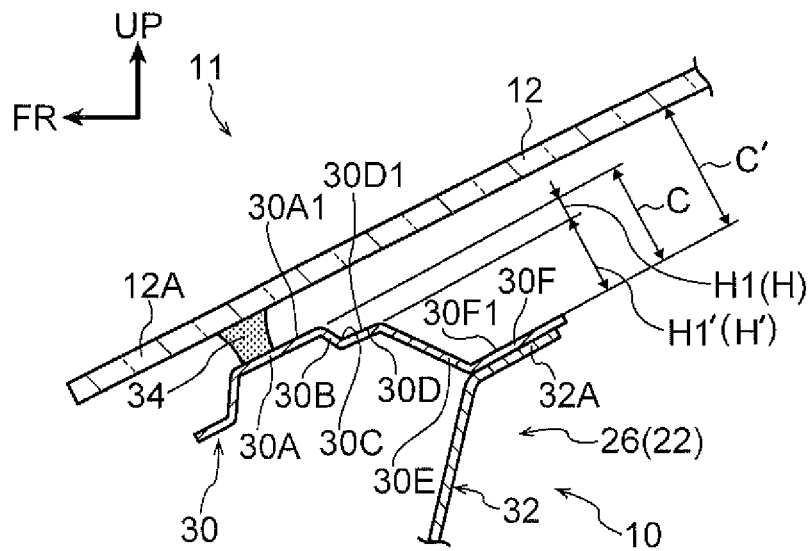
FIG. 6A is a magnified sectional diagram showing a magnification of a view cut along line 6A-6A in FIG. 5.
Figure 6B:
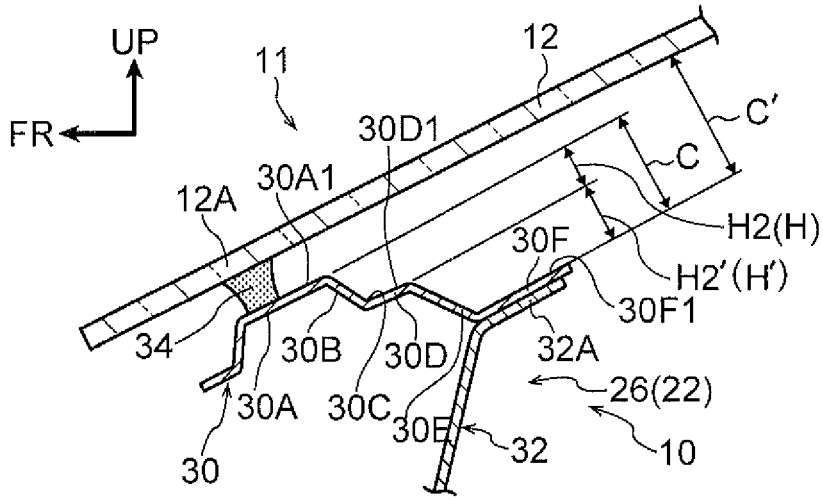
FIG. 6B is a magnified sectional diagram showing a magnification of a view cut along line 6B-6B in FIG. 5.
Figure 6C:
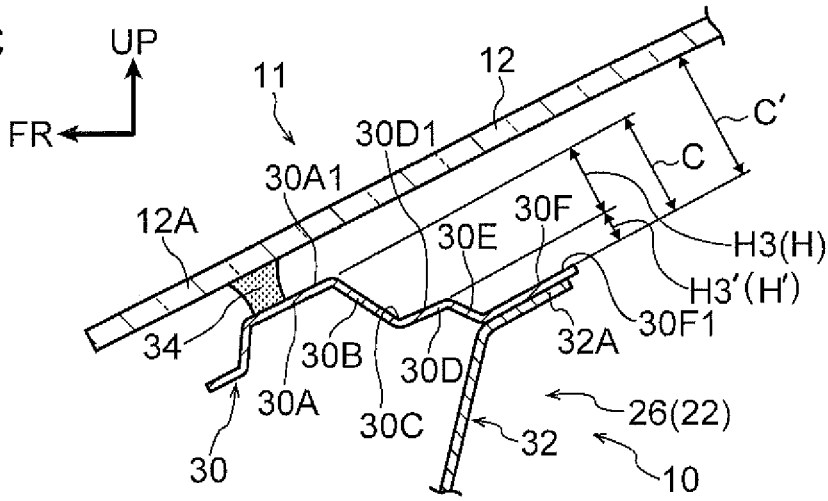
FIG. 6C is a magnified sectional diagram showing a magnification of a view cut along line 6C 6C in FIG. 5.

FIG. 6A is a sectional diagram of the cowl outer panel 30 showing a magnification of a view cut along line 6A 6A in FIG. 5. FIG. 6B is a sectional diagram of the cowl outer panel 30 showing a magnification of a view cut along line 6B-6B in FIG. 5. FIG. 6C is a sectional diagram of the cowl outer panel 30 showing a magnification of a view cut along line 6C-6C in FIG. 5.

As can be seen from FIG. 6A to FIG. 6C, in the present exemplary embodiment, a height dimension C between (an adhesion surface 30A1 of) the glass support portion 30A of the cowl outer panel 30 and (an upper face 30F1 of) the flange portion 30F is specified so as to be constant over the vehicle width direction. To be specific, the relationships $H1+H1'=H2+H2'=H3+H3'=C$ and $H1<H2<H3$ apply. Here, H1 is a height dimension in a normal direction of the front glass 12 from the adhesion surface 30A1 of the glass support portion 30A to the inclined surface 30D1 in the view cut along line 6A-6A in FIG. 5, H2 is a height dimension in the normal direction of the front glass 12 from the adhesion surface 30A1 of the glass support portion 30A to the inclined surface 30D1 in the view cut along line 6B-6B in FIG. 5, and H3 is a height dimension in the normal direction of the front glass 12 from the adhesion surface 30A1 of the glass support portion 30A to the inclined surface 30D1 in the view cut along line 6C-6C in FIG. 5. Correspondingly, HF is a height dimension in the normal direction of the front glass 12 from the inclined surface 30D1 of the glass support portion 30A to the upper face 30F1 of the flange portion 30F in the view cut along line 6A-6A in FIG. 5, H2' is a height dimension in the normal direction of the front glass 12 from the inclined surface 30D1 of the glass support portion 30A to the upper face 30F1 of the flange portion 30F in the view cut along line 6B-6B in FIG. 5, and H3' is a height dimension in the normal direction of the front glass 12 from the inclined surface 30D1 of the glass support portion 30A to the upper face 30F1 of the flange portion 30F in the view cut along line 6C-6C in FIG. 5. That is, in formation of the inclined surface 30D1 in the present exemplary embodiment, the height direction dimension H between the glass support portion 30A and the floor wall portion 30D is varied in the vehicle width direction in correspondence with the height dimension H' of the rear wall portion 30E.

—Operation and Effects of the Vehicle Cowl Structure—

Now, operation and effects of the vehicle cowl structure 10 according to the present exemplary embodiment are described.

If, for example, a door 17 or window 19 shown in FIG. 1 is left open during rainfall or the like and water ingresses to the inside of the vehicle cabin 16 shown in FIG. 2, humidity in the vehicle cabin 16 may rise. In conditions in which the external air temperature is low, condensation may form at the glass inner face 12B at the vehicle cabin 16 interior side of the front glass 12 and, as illustrated in FIG. 2, the water drops 46 may flow down the glass inner face 12B.

In this situation, as illustrated by the example in FIG. 13, if the water drops 46 flow down to a side at which a cowl outer panel 100 is disposed and water 102 accumulates on the cowl outer panel 100, the water 102 may pass over a distal end portion 100A1 of a flange portion 100A of the cowl outer panel 100. Electric components 108 are disposed in an interior portion 106 of an instrument panel 104. Therefore, the water 102 on the cowl outer panel 100 may flow down to the electric components 108.

Accordingly, in the present exemplary embodiment, as shown in FIG. 2, the floor wall portion 30D is provided at the cowl outer panel 30 and, as shown in FIG. 3 and FIG. 4, the downflow portions 42 are provided at the two vehicle width direction end portions of the floor wall portion 30D. Further, the drainage member 44 that drains the water drops (water) 46 out of the vehicle is provided at the lower side of each downflow portion 42. The drainage member 44 is in fluid communication with the drainage port 24A1 that is formed at the front pillar inner 24A and communicates with the vehicle exterior.

Therefore, the water drops 46 that have flowed down the glass inner face 12B of the front glass 12 are guided to each downflow portion 42 by the floor wall portion 30D of the cowl outer panel 30 and are drained through the drainage port 24A1 from the drainage member 44 to the vehicle exterior. Thus, according to the present exemplary embodiment, the water drops 46 that have flowed down the glass inner face 12B of the front glass 12 may be drained out of the vehicle.

Thus, for example, even when the water drops 46 that have flowed down the glass inner face 12B of the front glass 12 flow onto the cowl outer panel 30 as shown in FIG. 2, the water drops 46 are guided via the floor wall portion 30D to the sides at which the drainage members 44 are disposed. Therefore, pooling of the water drops 46 on the cowl outer panel 30 may be suppressed.

In the present exemplary embodiment, each inclined surface 30D1 is formed at the floor wall portion 30D and is angled to the lower side in the vehicle up-down direction in the direction toward the side at which the downflow portion 42 is disposed from the side that is further from the downflow portion 42. Therefore, the water drops 46 that have flowed down the glass inner face 12B of the front glass 12 are quickly guided along the inclined surface 30D1 of the floor wall portion 30D of the cowl outer panel 30 to the downflow portion 42. That is, pooling of the water drops 46 on the cowl outer panel 30 may be even further suppressed.

As described above, the inclined surface 30D1 that is angled to the lower side in the direction from the central portion toward the outer side in the vehicle width direction is formed at the floor wall portion 30D shown in FIG. 3 and FIG. 4. In this structure, the separation distance between the floor wall portion 30D and the front glass 12 is varied. FIG. 7A and FIG. 7B show magnified sectional diagrams corresponding to FIG. 6A. FIG. 7A shows a state just before an impact body (an impactor) 47 impacts against the front glass 12, and FIG. 7B shows a state when the impact body 47 has impacted against the front glass 12.

As shown in FIG. 7A and FIG. 7B, with a view to pedestrian protection and the like, the cowl 22 must deform to absorb an impact force when the impact body 47 impacts against the front glass 12. Therefore, a support stiffness of the front glass 12 by the cowl outer panel 30 and the cowl inner panel 32 is specified so as to be in a predetermined range.

Thus, it is desirable if a separation distance C' between the front glass 12 and a join portion of the cowl outer panel 30 with the cowl inner panel 32 (i.e., the flange portion 30F) is specified to be constant over the vehicle width direction. In the present exemplary embodiment, the term "constant" does not necessarily mean constant in a strict sense. That is, the separation distance C' may be "substantially constant"; fabrication tolerances and the like will of course be allowed within a range that provides the desired support stiffness for the front glass.

To be specific, in the present exemplary embodiment, as shown in FIG. 6A to FIG. 6C, the inclined surface 30D1 is formed by the height dimension H between the glass support portion 30A and the floor wall portion 30D being varied in the vehicle width direction in correspondence with the height dimension H' of the rear wall portion 30E. That is, in the formation of the inclined surface 30D1 of the present exemplary embodiment, the height dimension C between the glass support portion 30A and the flange portion 30F is kept constant over the vehicle width direction by the height dimension H between the glass support portion 30A and the floor wall portion 30D being varied over the vehicle width direction in correspondence with the height dimension H' of the rear wall portion 30E.

When the cowl 22 is considered as a unit, it does not include the front glass 12. Therefore, the height dimension C between the glass support portion 30A to which the sealing member 34 is adhered and the join portion (the flange portion 30F) is specified to be constant over the vehicle width direction. In consequence, the separation distance C' between the front glass 12 and the flange portion 30F is specified to be constant over the vehicle width direction.

In other words, in the present exemplary embodiment as shown in FIG. 6A to FIG. 6C, in the formation of the inclined surface 30D1 of the floor wall portion 30D, the position of the inflection portion 30C in the vehicle up-down direction is varied and the height dimension C between the glass support portion 30A and the flange portion 30F is kept constant. Therefore, cross-sectional crushing of the cowl 22 for pedestrian protection need not be greatly affected by the formation of the inclined surface 30D1.

That is, according to the present exemplary embodiment, the support stiffness of the front glass 12 may be assured even though the inclined surface 30D1 is formed at the floor wall portion 30D of the cowl outer panel 30 to be angled to the lower side in the direction from the central portion toward the outer side in the vehicle width direction.

—Alternative Embodiments—

(1) In the present exemplary embodiment, as shown in FIG. 6A to FIG. 6C, the flange portion 30F is provided at the rear end portion of the cowl outer panel 30, the flange portion 32A is provided at the rear end portion of the cowl inner panel 32, and the flange portion 32A and flange portion 30F are joined to one another in a state in which the same are superposed up-and-down. However, it is sufficient if the cowl outer panel 30 and the cowl inner panel 32 are joined to one another. Therefore, the flange portions 30F and 32A are not necessarily required.

For example, as shown in FIG. 8A to FIG. 8C, a joining wall 50A may protrude toward the lower side from a rear end portion of the rear wall portion 30E of a cowl outer panel 50, a joining wall 52A may protrude toward the upper side from the rear wall portion 32B of a cowl inner panel 52, and the joining wall 50A and joining wall 52A may be joined to one another in a state in which the same are superposed in the vehicle front-rear direction.

(2) In the present exemplary embodiment, as shown in FIG. 4, the downflow portions 42 are provided at the vehicle width direction outer sides of the floor wall portion 30D of the cowl outer panel 30. However, locations at which the downflow portion 42 is provided are not limited thus. For example, as shown in FIG. 9, a downflow portion 58 may be provided at a vehicle width direction central portion of a floor wall portion 56A of a cowl outer panel 56.

When the downflow portions 42 are provided at the vehicle width direction outer sides of the floor wall portion 30D of the cowl outer panel 30 as shown in FIG. 4, the floor wall portion 30D includes the inclined surfaces 30D1 that are each angled to the lower side in the direction from the central portion toward the outer side in the vehicle width direction.

In contrast, as shown in FIG. 9, when the downflow portion 58 is provided at the vehicle width direction central portion of the floor wall portion 56A of the cowl outer panel 56, the floor wall portion 56A includes inclined surfaces 56A1 that are each angled to the lower side in the direction from the outer side toward the central portion in the vehicle width direction. A drainage portion 60 is provided at the lower side of the downflow portion 58. In this structure, a duct 62 may be provided instead of the drainage member 44 (see FIG. 4). Water flowing down from the downflow portion 58 may be drained out of the vehicle through the duct 62.

(3) In the present exemplary embodiment, as shown in, for example, FIG. 3, the floor wall portion 30D that protrudes toward the lower side is provided at a rear end portion of the cowl outer panel 30 and each end portion of the floor wall portion 30D serves as the downflow portion 42. However, a hole portion (not shown in the drawings) may be formed in the floor wall portion 30D and this hole portion may serve as the downflow portion.

(4) In the present exemplary embodiment, each inclined surface 30D1 is formed continuously along the vehicle width direction, and is formed with a single angle (or curvature). However, although not shown in the drawings, the inclined surface 30D1 may be formed such that plural inclined surfaces with different angles (or curvatures) succeed one another. For example, the inclination angle may be specified to be larger at the side of the central portion in the vehicle width direction than at the outer side in the vehicle width direction. Thus, the water drops 46 may be more quickly guided to the vehicle width direction outer sides. Further, the inclined surface 30D1 may be formed with a single gradient, and steps may be provided at predetermined positions of the inclined surface 30D1 in the vehicle width direction.

(5) In the present exemplary embodiment, the water drops 46 that flow down in the drainage member 44 from the downflow portion 42 formed at the cowl outer panel 30 are drained out of the vehicle through the rocker from the drainage port 24A1 formed in the front pillar inner 24A. However, for the present invention it is sufficient that the water drops 46 can be drained out of the vehicle. Therefore, the drainage pathway may be different from the above. Moreover, the drainage member 44 is not necessarily required. For example, the downflow portion 42 of the cowl outer panel 30 may be in fluid communication with the drainage port 24A1 of the front pillar inner 24A.

=Second Exemplary Embodiment=

Now, a vehicle cowl structure according to a second exemplary embodiment is described. Details that are substantially the same as in the first exemplary embodiment are assigned the same reference numerals and are not described here.

Figure 10A:
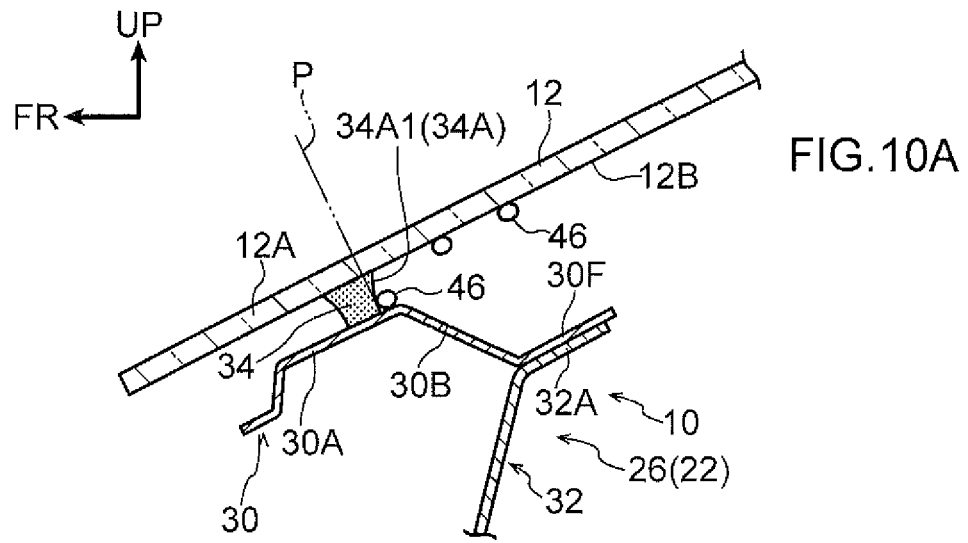
FIG. 10A is a magnified sectional diagram, corresponding to FIG. 6A, showing a cowl structure for a vehicle in accordance with a second exemplary embodiment.
Figure 10B:
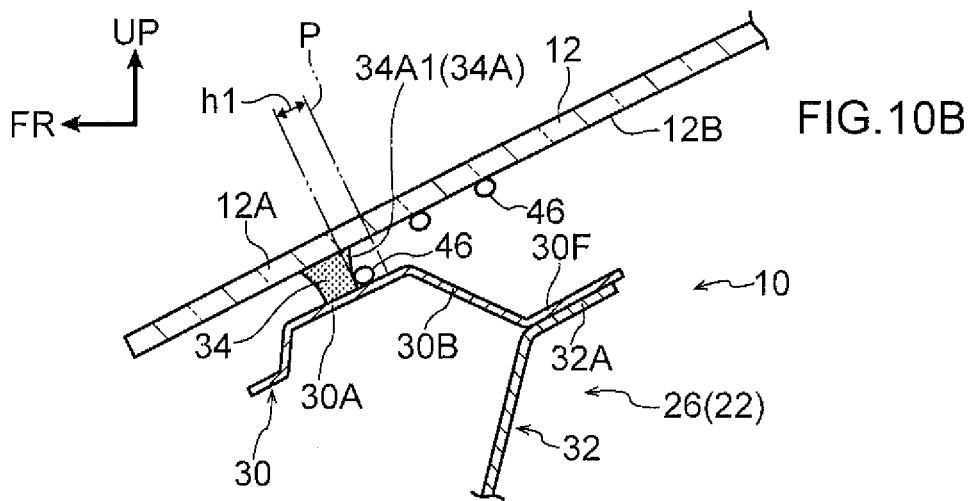
FIG. 10B is a magnified sectional diagram, corresponding to FIG. 6B, showing the cowl structure for a vehicle in accordance with the second exemplary embodiment.
Figure 10C:
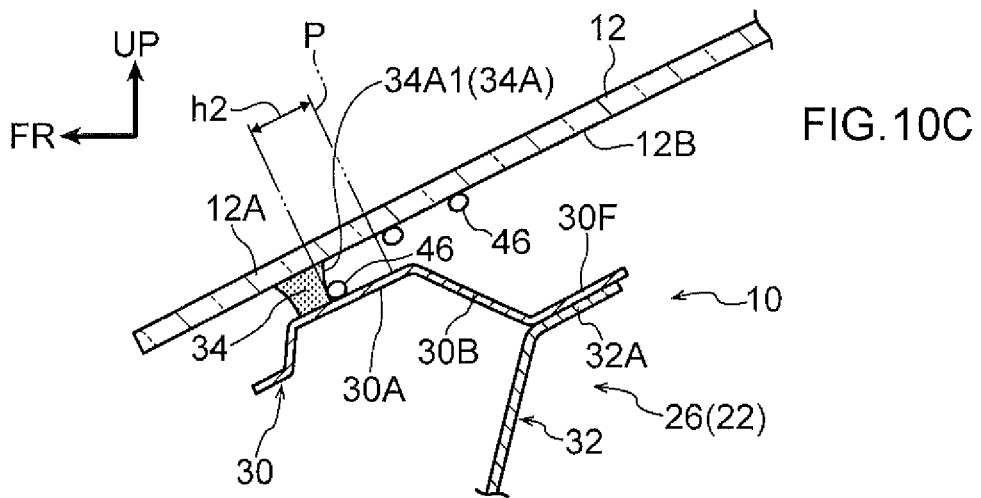
FIG. 10C is a magnified sectional diagram, corresponding to FIG. 6C, showing the cowl structure for a vehicle in accordance with the second exemplary embodiment.

In the first exemplary embodiment, as shown in FIG. 6A to FIG. 6C, the cowl outer panel 30 is employed that structures a portion of the drainage apparatus 36 and serves as a member that guides the water drops 46 that have flowed down the glass inner face 12B of the front glass 12. In the present exemplary embodiment, in contrast, the sealing member 34 that seals the front glass 12 is utilized instead of the cowl outer panel 30, as illustrated in FIG. 10A to FIG. 10C. FIG. 10A to FIG. 10C are magnified sectional diagrams corresponding to FIG. 6A to FIG. 6C, respectively.

As can be seen from FIG. 10A to FIG. 10C, the sealing position of the sealing member 34 with the front glass 12 is specified to be angled to the lower side in the direction from the central portion toward each outer side in the vehicle width direction. To describe this more specifically, as shown in FIG. 10A, a straight line along the normal direction of the front glass 12 that passes through a position of an inclined surface 34A1 of the sealing member 34 at the vehicle width direction central portion side of the sealing member 34 (at a position along line 6A-6A shown in FIG. 5) is a reference line P. As shown in FIG. 10B, a position of the inclined surface 34A1 of the sealing member 34 at a position along line 6B-6B shown in FIG. 5 is displaced along the glass inner face 12B of the front glass 12 from the reference line P by a dimension h1 toward the front side in the vehicle front-rear direction, and as shown in FIG. 10C, a position of the inclined surface 34A1 of the sealing member 34 at a position along line 6C-6C shown in FIG. 5 is displaced along the glass inner face 12B of the front glass 12 from the reference line P by a dimension h2 toward the front side in the vehicle front-rear direction (h2>h1). That is, the inclined surface 34A1 is formed by a side face 34A of the sealing member 34 at the vehicle cabin 16 interior side thereof, and the inclined surface 34A is angled to the lower side in the vehicle up-down direction in the direction toward the side of the sealing member 34 at which the downflow portion 42 is disposed from the side of the sealing member 34 that is further from the downflow portion 42 (see FIG. 4). Hence, the water drops 46 are guided along the inclined surface 34A1 to the downflow portion 42 and drained out of the vehicle. An inclined surface 64C1 of a mounting member 64 (see FIG. 11A to FIG. 11C) and an inclined surface 66A1 of a water-sealing sponge 66 (see FIG. 12A to FIG. 12C), which are described below, are formed in substantially the same form as the inclined surface 34A1 of the sealing member 34. Accordingly, descriptions of their forms are not given below.

According to the present exemplary embodiment, the water drops 46 that have flowed down the glass inner face 12B are guided to the downflow portions 42 by the sealing member 34 that seals between the front glass 12 and the cowl outer panel 30, and are drained out of the vehicle through the downflow portions 42.

In the present exemplary embodiment, the sealing position of the sealing member 34 is simply varied to be angled to the lower side in the direction from the central portion toward the outer side in the vehicle width direction. Therefore, costs may be reduced compared to a structure in which a guide member for guiding the water drops 46 is provided separately. Furthermore, because there is no need to form the floor wall portion 30D at the cowl outer panel 30, a conventional cowl outer panel may be used as is, simply with the downflow portions 42 being formed at the cowl outer panel.

=Third Exemplary Embodiment=

Now, a vehicle cowl structure according to a third exemplary embodiment is described. Details that are substantially the same as in the first exemplary embodiment are assigned the same reference numerals and are not described here.

In the first exemplary embodiment, as shown in FIG. 6A to FIG. 6C, the cowl outer panel 30 is employed that structures a portion of the drainage apparatus 36 and serves as a member that guides the water drops 46 that have flowed down the glass inner face 12B of the front glass 12. In contrast, in the present exemplary embodiment, instead of the cowl outer panel 30, the mounting member 64 is mounted to the front end portion 14A of the instrument panel 14 as illustrated in FIG. 11A to FIG. 11C. FIG. 11A to FIG. 11C are magnified sectional diagrams corresponding to FIG. 6A to FIG. 6C, respectively.

As shown in FIG. 11A to FIG. 11C, a cross-sectional shape of the mounting member 64 cut along the vehicle front-rear direction forms a substantial "C" shape. An upper end portion (one end portion) 64A of the mounting member 64 abuts against the glass inner face 12B of the front glass 12, and a lower end portion (another end portion) 64B of the mounting member 64 abuts against a lower face 14B of the instrument panel 14 (a face of the instrument panel 14 that is at the opposite side thereof from the side at which the front glass 12 is disposed). The mounting member 64 is mounted at the front end portion 14A of the instrument panel 14 In this state.

As can be seen from FIG. 11A to FIG. 11C, a central portion 64C of the mounting member 64 that is disposed between the upper end portion 64A and the lower end portion 64B is specified to be angled to the lower side in the direction from the central portion toward each outer side in the vehicle width direction. That is, the inclined surface 64C1 is formed by the central portion 64C of the mounting member 64, and the inclined surface 64C1 is angled to the lower side in the vehicle up-down direction in the direction toward the side of the mounting member 64 at which the downflow portion 42 is disposed from the side of the mounting member 64 that is further from the downflow portion 42 (see FIG. 4). Hence, the water drops 46 are guided along the inclined surface 64C1 to the downflow portion 42 and drained out of the vehicle.

According to the present exemplary embodiment, the water drops 46 that have flowed down the glass inner face 12B are guided to the downflow portions 42 by the mounting member 64 that abuts against the front glass 12 and the instrument panel 14, and are drained out of the vehicle through the downflow portions 42. Furthermore, according to the present exemplary embodiment, because there is no need to form the floor wall portion 30D at the cowl outer panel 30, a conventional cowl outer panel may be used as is, simply with the downflow portions 42 being formed at the cowl outer panel.

=Fourth Exemplary Embodiment=

Now, a vehicle cowl structure according to a third exemplary embodiment is described. Details that are substantially the same as in the first exemplary embodiment are assigned the same reference numerals and are not described here.

In the first exemplary embodiment, as shown in FIG. 6A to FIG. 6C, the cowl outer panel 30 is employed that structures a portion of the drainage apparatus 36 and serves as a member that guides the water drops 46 that have flowed down the glass inner face 12B of the front glass 12. In the present exemplary embodiment, in contrast, the water-sealing sponge 66 is utilized instead of the cowl outer panel 30, as illustrated in FIG. 12A to FIG. 12C. The water-sealing sponge 66 abuts against the front glass 12 and the instrument panel 14 at the side of the instrument panel 14 at which the front end portion 14A is disposed. FIG. 12A to FIG. 12C are magnified sectional diagrams corresponding to FIG. 6A to FIG. 6C, respectively.

As can be seen from FIG. 12A to FIG. 12C, abutting positions of the water-sealing sponge 66 against the front glass 12 and the instrument panel 14 are specified so as to be angled to the lower side in the direction from the central portion towards each outer side in the vehicle width direction. That is, the inclined surface 66A1 is formed by a side face 66A of the water-sealing sponge 66 at the vehicle cabin 16 interior side of the water-sealing sponge 66, and the inclined surface 66A1 is angled to the lower side in the vehicle up-down direction in the direction toward the side of the water-sealing sponge 66 at which the downflow portion 42 is disposed from the side of the water-sealing sponge 66 that is further from the downflow portion 42 (see FIG. 4). Hence, the water drops 46 are guided along the inclined surface 66A1 to the downflow portion 42 and drained out of the vehicle.

According to the present exemplary embodiment, the water drops 46 that have flowed down the glass inner face 12B are guided to the downflow portions 42 by the water-sealing sponge 66 that abuts against the front glass 12 and the instrument panel 14, and are drained out of the vehicle through the downflow portions 42. Furthermore, according to the present exemplary embodiment, because there is no need to form the floor wall portion 30D at the cowl outer panel 30, a conventional cowl outer panel may be used as is, simply with the downflow portions 42 being formed at the cowl outer panel.

Hereabove, the present invention has been described in accordance with the exemplary embodiments, but the present invention is not limited by these exemplary embodiments. The exemplary embodiments and various variant examples may be used in suitable combinations, and it will be clear that numerous modes may be embodied within a technical scope not departing from the gist of the present invention.

The invention claimed is:

1. A cowl structure for a vehicle, comprising:
   a cowl outer panel that extends in a vehicle width direction at a front end portion of a front windshield glass, the cowl outer panel supporting the front end portion of the front windshield glass from a lower side of the front windshield glass via a sealing member; and
   a drainage apparatus disposed at a rear side, in a vehicle front-rear direction, of the sealing member, at least a portion of the drainage apparatus being provided at the cowl outer panel, and the drainage apparatus draining, out of the vehicle, water drops that have flowed down a glass inner face at a vehicle cabin interior side of the front windshield glass.

2. The cowl structure for a vehicle according to claim 1, wherein the drainage apparatus includes:
   a downflow portion provided at a vehicle width direction end portion or a vehicle width direction central portion of the cowl outer panel;
   a floor wall portion provided along the vehicle width direction at the cowl outer panel, an inclined surface being formed at the floor wall portion, and the inclined surface being angled toward a lower side, in a vehicle up-down direction, of the downflow portion, from a side of the floor wall portion that is further from the downflow portion; and a drainage member disposed at the lower side, in the vehicle up-down direction, of the downflow portion, the drainage member draining the water drops out of the vehicle.

3. The cowl structure for a vehicle according to claim 2, wherein:
the sealing member is adhered to the front windshield glass or the cowl outer panel at an adhesion portion,
a cowl inner panel is disposed at a lower side, in the vehicle up-down direction, of the cowl outer panel, the cowl outer panel being joined to the cowl inner panel at a join portion, and
a dimension in a normal direction of the front windshield glass from the adhesion portion to the join portion is constant over the whole range in the vehicle width direction of the cowl structure.

4. The cowl structure for a vehicle according to claim 1, wherein the drainage apparatus includes:
a downflow portion provided at a vehicle width direction end portion or a vehicle width direction central portion of the cowl outer panel; and
a drainage member disposed at a lower side, in a vehicle up-down direction, of the downflow portion, the drainage member draining the water drops out of the vehicle,
a sealing position of the sealing member with the front windshield glass being angled toward a lower side, in a vehicle up-down direction, of the downflow portion from a side of the sealing member that is further from the downflow portion.

5. The cowl structure for a vehicle according to claim 1, wherein the drainage apparatus includes:
a downflow portion provided at a vehicle width direction end portion or a vehicle width direction central portion of the cowl outer panel;
a drainage member disposed at a lower side, in a vehicle up-down direction, of the downflow portion, the drainage member draining the water drops out of the vehicle; and
a mounting member that is mounted at a front end portion of an instrument panel of the vehicle,
one end portion of the mounting member being abutted against the front windshield glass,
another end portion of the mounting member being abutted against a face of the instrument panel at an opposite side of the instrument panel from a side at which the front windshield glass is disposed, and
a central portion of the mounting member that is disposed between the one end portion and the other end portion being formed so as to be angled toward a lower side, in the vehicle up-down direction, of the downflow portion from a side of the mounting member that is further from the downflow portion.

6. The cowl structure for a vehicle according to claim 1, wherein the drainage apparatus includes:
a downflow portion provided at a vehicle width direction end portion or a vehicle width direction central portion of the cowl outer panel;
a drainage member disposed at a lower side, in a vehicle up-down direction, of the downflow portion, the drainage member draining the water drops out of the vehicle; and
a water-sealing sponge that is abutted against a front end portion of an instrument panel of the vehicle and the front windshield glass, an abutting position of the water-sealing sponge against the instrument panel being angled to a lower side, in a vehicle up-down direction, of the downflow portion from a side of the water-sealing sponge that is further from the downflow portion.

7. The cowl structure for a vehicle according to claim 2, wherein the drainage member includes:
an inflow port that is in fluid communication with the downflow portion, and
an outflow port that is in fluid communication with a drainage outlet, the drainage outlet being formed at a body side and draining the water drops out of the vehicle.

8. The cowl structure for a vehicle according to claim 1, wherein the drainage apparatus is structured so as to drain water drops, that have dropped onto the cowl outer panel, out of the vehicle by a cross-sectional shape of the cowl outer panel cut along a vehicle up-down direction being varied along the cowl outer panel in the vehicle width direction.

9. The cowl structure for a vehicle according to claim 7, wherein the outflow port is formed at a front pillar that is disposed at a vehicle width direction end portion of the cowl outer panel, the water drops being drained out of the vehicle through the outflow port.

10. The cowl structure for a vehicle according to claim 3, wherein the cowl outer panel includes:
a glass support portion that is parallel with the front windshield glass and that serves as the adhesion portion;
a front wall portion that is inflected toward the lower side, in the vehicle up-down direction, from a rear end portion, in the vehicle front-rear direction, of the glass support portion;
a floor wall portion that is inflected toward a rear side, in the vehicle front-rear direction, and the upper side, in the vehicle up-down direction, from a rear end portion, in the vehicle front-rear direction, of the front wall portion, the floor wall portion being parallel with the front windshield glass;
a rear wall portion that is inflected toward the lower side, in the vehicle up-down direction, from a rear end portion, in a vehicle front-rear direction, of the floor wall portion; and
a flange portion that is inflected toward the rear side, in the vehicle front-rear direction, and the upper side, in the vehicle up-down direction, from a rear end portion, in the vehicle front-rear direction, of the rear wall portion, and that is parallel with the front windshield glass, and that serves as the join portion, the flange portion being superposed in the vehicle up-down direction with a joined portion of the cowl inner panel.

11. The cowl structure for a vehicle according to claim 3, wherein the cowl outer panel includes:
a glass support portion that is parallel with the front windshield glass and serves as the adhesion portion;
a front wall portion that is inflected toward the lower side, in the vehicle up-down direction, from a rear end portion, in the vehicle front-rear direction, of the glass support portion;
a floor wall portion that is inflected toward a rear side, in the vehicle front-rear direction, and the upper side, in the vehicle up-down direction, from a rear end portion, in the vehicle front-rear direction, of the front wall portion, the floor wall portion being parallel with the front windshield glass;

a rear wall portion that is inflected toward the lower side, in the vehicle up-down direction, from a rear end portion, in the vehicle front-rear direction, of the floor wall portion; and a joining wall that protrudes toward a lower side, in the vehicle up-down direction, from a rear end portion, in the vehicle front-rear direction, of the rear wall portion, and that serves as the join portion, the joining wall being superposed in the vehicle front-rear direction with a joined portion of the cowl inner panel.

* * * * *